US012763928B2

(12) United States Patent
Osborn et al.

(10) Patent No.: US 12,763,928 B2
(45) Date of Patent: Oct. 13, 2026

(54) TELEPHONE URI PROCESSING WITH NFC AND CRYPTOGRAPHIC ONE TIME PASSWORD

(71) Applicant: Capital One Services, LLC, McLean, VA (US)

(72) Inventors: Kevin Osborn, Newton Highlands, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/930,382

(22) Filed: Oct. 29, 2024

(65) Prior Publication Data

US 2026/0121836 A1 Apr. 30, 2026

(51) Int. Cl.
*H04L 9/06* (2006.01)
*G06K 19/04* (2006.01)
*H04M 3/493* (2006.01)

(52) U.S. Cl.
CPC ............ *H04L 9/065* (2013.01); *G06K 19/045* (2013.01); *H04M 3/493* (2013.01)

(58) Field of Classification Search
CPC ........................................................ H04L 9/065
See application file for complete search history.

(56) References Cited

U.S. PATENT DOCUMENTS 5,590,038 A 12/1996 Pitroda
5,666,415 A 9/1997 Kaufman
6,199,114 B1 3/2001 White
6,324,271 B1 11/2001 Sawyer
6,367,011 B1 4/2002 Lee
6,572,015 B1 6/2003 Norton
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr
(Continued)

FOREIGN PATENT DOCUMENTS

CN 101192295 A 6/2008
GB 2516861 A 2/2015
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Simon P Kanaan
(74) *Attorney, Agent, or Firm* — KDW Firm, PLLC

(57) ABSTRACT

Embodiments are directed to systems and techniques to perform authentication operations in a call center computing environment with transcoded encrypted data.

20 Claims, 18 Drawing Sheets

(56) References Cited

U.S. PATENT DOCUMENTS 7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort et al.
9,501,776 B2 11/2016 Martin
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,733,283 B1 * 8/2020 Osborn .................. G06F 21/35
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 Mchugh
11,777,933 B2 10/2023 Moreton
2003/0220876 A1 11/2003 Burger et al.
2005/0156026 A1 7/2005 Ghosh
2005/0228997 A1 10/2005 Bicker
2005/0269402 A1 12/2005 Spitzer et al.
2006/0233360 A1 * 10/2006 Gammel ................. H04L 9/065 380/37
2007/0276765 A1 11/2007 Hazel et al.
2008/0082452 A1 4/2008 Wankmueller et al.
2008/0099552 A1 5/2008 Grillion
2009/0143104 A1 6/2009 Loh et al.
2010/0322415 A1 * 12/2010 Gondkar ................. H04L 9/065 380/42
2011/0155801 A1 6/2011 Rowberry
2012/0143703 A1 6/2012 Wall
2013/0030997 A1 1/2013 Spodak et al.
2013/0146657 A1 6/2013 Graef et al.
2013/0211937 A1 8/2013 Elbirt
2013/0311363 A1 11/2013 Ramaci
2014/0074637 A1 3/2014 Hammad
2014/0074655 A1 3/2014 Lim
2014/0081785 A1 3/2014 Valadas Preto
2014/0365377 A1 12/2014 Salama et al.
2015/0032635 A1 1/2015 Guise
2015/0073983 A1 3/2015 Bartenstein et al.
2015/0113271 A1 4/2015 Jooste et al.
2015/0134513 A1 5/2015 Olson et al.
2015/0199673 A1 7/2015 Savolainen
2015/0199863 A1 7/2015 Scoggins et al.
2015/0254637 A1 9/2015 Yang
2015/0317295 A1 11/2015 Sherry et al.
2016/0006708 A1 * 1/2016 Sawafuji ............... H04L 9/0894 713/190
2016/0078430 A1 3/2016 Douglas
2016/0189143 A1 6/2016 Koeppel
2016/0253651 A1 9/2016 Park
2016/0277383 A1 9/2016 Francois-Eric
2016/0307189 A1 10/2016 Zarakas
2016/0314472 A1 10/2016 Ashfield
2016/0379217 A1 12/2016 Hammad
2017/0017957 A1 1/2017 Radu
2017/0039566 A1 2/2017 Schipperheijn
2017/0068950 A1 3/2017 Kwon
2017/0330173 A1 11/2017 Woo
2018/0039987 A1 2/2018 Molino
2018/0268132 A1 9/2018 Buer
2018/0300716 A1 10/2018 Carlson
2019/0172055 A1 6/2019 Hale
2019/0303945 A1 10/2019 Mitra
2021/0004806 A1 1/2021 Noe
2021/0272098 A1 9/2021 Delsuc et al.
2021/0304189 A1 9/2021 Gupta
2021/0357921 A1 * 11/2021 Vargas .................. G07F 7/1008
2021/0383360 A1 12/2021 Sinha
2021/0406869 A1 12/2021 Pathrabe
2022/0114581 A1 4/2022 Upadhye
2022/0284416 A1 9/2022 Rule
2022/0309509 A1 9/2022 Akgun
2022/0335412 A1 10/2022 Rule
2022/0366410 A1 11/2022 Rule
2022/0398566 A1 12/2022 Rule
2022/0414648 A1 12/2022 Rule
2023/0054157 A1 2/2023 Mao
2023/0065163 A1 3/2023 Vargas
2023/0083785 A1 3/2023 Maiman
2023/0169505 A1 6/2023 Rule

(56) References Cited

U.S. PATENT DOCUMENTS

| | | | |
|---|---|---|---|
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| GB | 2551907 | A | 1/2018 |
| KR | 20150140132 | A | 12/2015 |
| WO | 199910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card User Authentication for Contactless Smart Cards based on Gesture Recognition", paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Saush, "Getting information from an EMV chip card with Java," Sep. 8, 2006, WordPress, pp. 1-13.

* cited by examiner

TELEPHONE URI PROCESSING WITH NFC AND CRYPTOGRAPHIC ONE TIME PASSWORD

BACKGROUND

Contactless card products have become so universally well-known and ubiquitous that they have fundamentally changed the manner in which financial transactions and dealings are viewed and conducted in society today. Contactless card products are most commonly represented by plastic or metal card-like members that are offered and provided to customers through credit card issuers (such as banks and other financial institutions). With a card, an authorized customer or cardholder is capable of purchasing services and/or merchandise without an immediate, direct exchange of cash. Data security and transaction integrity are of critical importance to businesses facilitating these transactions and to the customers. This need continues to grow as electronic transactions performed with contactless cards constitute an increasingly large share of commercial activity.

Additionally, in the context of call centers and similar organizations that receive customer or client calls, it is often difficult to verify the identity of the caller before the call progressing to an agent at the call center receiving the call and speaking with the caller. At that point, the caller is asked to provide personal details verifying their identity. However, by this time, call center resources are already being utilized if it turns out the caller is not a verified customer associated with the call center. Additionally, when the agent asks the caller to provide their personal information such as a code, account number, or other data, sometimes the caller may have forgotten their personal information, which wastes valuable time. Similar issues occur when the caller is asked for personal information, even before the call is transferred to an agent. For example, in some cases, before a caller is transferred to the agent, the caller is asked (e.g., in an automated process) to provide their secret passcode or an answer to another question indicating their identity. Again, this can be cumbersome as some callers might not remember their code or might not remember the answer to a unique question they provided. Accordingly, there is a need to provide businesses and users with an appropriate solution that overcomes current deficiencies to provide data security, authentication, and verification for these and other similar scenarios.

SUMMARY

One general aspect includes a method to verify an identity of a user attempting to make a call to a call center system or other similar facility. The method includes transcoding, by a processor circuit of a contactless card, encrypted data into transcoded data, the encrypted data generated based on one or more cryptographic algorithms and one or more session keys generated from one or more diversified keys stored on the contactless card. In some cases, transcoding the encrypted data includes accessing, by the processor circuit, the encrypted data, converting the encrypted data into a corresponding numeric data stream, and inserting characters into the corresponding numeric data stream to indicate data separation in the transcoded data. The method further includes transmitting, via a communication interface of the contactless card, the transcoded data to a mobile device associated with a user account of the contactless card.

Another general aspect includes an apparatus comprising a memory to store instructions, a communication interface, and a processing circuit to execute the instructions. When the instructions are executed by the processing circuit, the apparatus is caused to receive, via the communication interface of the apparatus, transcoded data, the transcoded data being transcoded from encrypted data associated with a user account, wherein the transcoded data is included in a uniform resource identifier (URI) for a communication to be initiated by the apparatus. The apparatus is further caused to, in response to receiving the transcoded data, automatically initiate the communication based on the transcoded data in the URI.

Another general aspect of this disclosure includes a non-transitory computer-readable storage medium having executable instructions stored thereon, which when executed by a processing circuit of a contactless card cause the contactless card to transcode encrypted data into transcoded data, the encrypted data generated based on one or more cryptographic algorithms and one or more session keys generated from a diversified key stored on the contactless card. Transcoding the encrypted data includes the processing circuit to access the encrypted data, convert the encrypted data into a corresponding numeric data stream, and insert characters into the corresponding numeric data stream to indicate data separation in the transcoded data. Execution of the instructions further causes the contactless card to further transmit, via a communication interface of the contactless card, the transcoded data to a mobile device associated with a user account of the contactless card.

Non-transitory computer program products (i.e., physically embodied computer program products), referenced herein, are described as storing instructions, which, when executed by one or more data processors (i.e., processor or processing circuit) of one or more computing systems, cause at least one data processor to perform operations herein. Similarly, computer systems are also described, which may include one or more data processors or processing circuitry and memory coupled to the one or more data processors. The memory may temporarily or permanently store instructions that cause at least one processor to perform one or more of the operations described herein. In addition, methods can be implemented by one or more data processors, which are either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
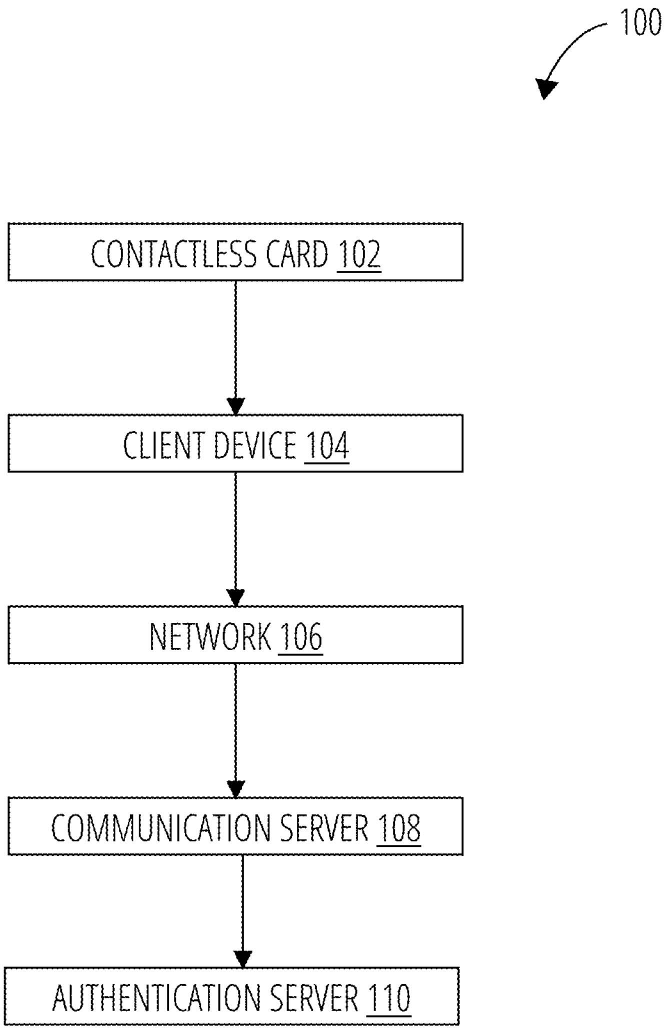
FIG. 1 illustrates an aspect a data transmission system in accordance with one embodiment.

For example, contactless card functions discussed herein may be utilized in a computing environment. These functions may include tap-to functions where a user may tap their contactless card on a device, such as a mobile device, to perform a function. For example, a user may utilize their contactless card to verify their identity, perform a payment, launch applications, log into applications, autofill a form or field, send a uniform resource indicator (URI) or other message to a computing device (e.g., mobile device). The URI or other message includes encrypted data for verifying the identity of a user account associated with the contactless card, navigating to a specified web location or app on a device, unlocking a door, initiating a contactless card, verifying themselves, and so forth.

The systems and methods discussed herein may enable users to perform some of these functions in a multi-issuer environment. Further, the systems discussed herein enable card issuers or payment providers, such as banks, to issue contactless cards with tap-to functions to customers while maintaining high-level security. The systems discussed differ from previous solutions because they provide a single platform for multiple issuers to provide the tap-to functionality. Traditionally, each issuer must set up and maintain its own systems to provide contactless card features. This includes maintaining their own hardware, software, databases, security protocols, and so forth, which can become extremely costly for the issuer to maintain. However, the embodiments discussed herein enable issuers to offload much of the processing, storage, and security functionality to a neutral or central system. As discussed in more detail, the central system is configured to provide contactless card features for multiple issuers while maintaining high security and data integrity. Each issuer's functionality and data may be separately managed and secured such that another issuer cannot access another issuer's data or functions. As discussed in more detail, these features may be provided by a switchboard system configured to process and perform each contactless card function securely. Additional benefits for issuers may include providing a highly secure authentication option for mobile web, which typically lacks the robust authentication options available in a native application.

Further, embodiments discussed herein support tap-to mobile web experiences on both major mobile platforms (iOS®, Android®) by leveraging App Clips® and Javascript® software development kid (SDK) with WebNFC®. For IOS®, embodiments include providing a tap-to SDK including functions and services to perform the operations discussed herein on the iOS® platform. The SDK may be installed into the host application, e.g., a native app or web browser app, and includes App Clip® support. The SDK provides functional support for near-field communication between the mobile device and contactless card, installing a native app via App Clips®, and functionality to obscure data and/or portions of a display. In one example, the SDK may be configured to download and install the app from an app store, such as Apple's® App Store.

In the Android® operating system environment, embodiments include utilizing a JavaScript SDK. The JavaScript SDK may be installed into a website e.g., via source code. The JavaScript SDK also includes functions to support NFC communications between mobile devices and contactless cards via WebNFC®. The JavaScript SDK may also include functions to provide customizable user interface (UI) capabilities and obfuscation. In embodiments, the JavaScript SDK supports websites utilizing Hypertext Transfer Protocol Secure (HTTPS) and supports the React® library. Embodiments are not limited in this manner, and UI libraries may be supported.

Embodiments of the present disclosure are provided to transcode encrypted data that is typically encrypted as hexadecimal data streams into decimal or base-ten format so that the encrypted data can be processed and transmitted using systems that traditionally process data streams using base-ten format. For example, one embodiment of the disclosed subject matter herein includes transcoding encrypted data into base-ten from hexadecimal so that it can be sent via or during a telephone call, which typically only uses base-ten numbers 0-9.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is herein, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 illustrates a data transmission system 100 according to an example embodiment. As further discussed below, system 100 may include contactless card 102, client device 104, network 106, communication server 108, and authentication server 110. Although FIG. 1 illustrates single instances of the components, system 100 may include any number of components.

System 100 may include one or more contactless cards 102, which are further explained below. In some embodiments, contactless card 102 may be in wireless communication, utilizing NFC, BlueTooth®, Wi-Fi, or radio frequency identification (RFID), as examples, with client device 104.

System 100 may include client device 104, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 104 also may be a mobile device or smart phone; for example, a mobile device or smart phone may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 104 can include processing circuitry (e.g., a processor and a memory), and it is understood that the processing circuitry may contain additional components, including processors, memories, error and parity/CRC checkers, data encoders, anticollision algorithms, controllers, command decoders, security primitives and tamper-proofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

The client device 104 can further include one or more communication interfaces that allow communication between the client device 104 and contactless card 102, network 106, communication server 108, authentication server 110, any any other suitable device. This one or more communication interfaces can allow communication between the client device 104 and the contactless card 102, network 106, communication server 108, and authentication server 110 via NFC, RFID, Wi-Fi, BlueTooth®, a local area network (LAN), wide area network (WAN), mobile communications network such as 2G, 3G, 4G/LTE, 5G, 6G, or any other suitable communications network.

In some examples, client device 104 of system 100 may execute one or more applications, such as software applications, that enable, for example, network communications with one or more components of system 100 and transmit and/or receive data.

The client device 104 may be in communication with one or more server(s) via one or more network 106 and may operate as a respective front-end to back-end pair with communication server 108. The client device 104 may transmit, for example from a mobile device application executing on client device 104, one or more messages or requests to communication server 108 or authentication server 110. The one or more messages requests may be associated with retrieving data from or sending data to communication server 108. The communication server 108 may receive the one or more requests from client device 104. Based on the one or more requests from client device 104, communication server 108 may be configured to retrieve the requested data from one or more databases (not shown). Based on receipt of the requested data from the one or more databases, communication server 108 may be configured to transmit the received data to client device 104, the received data being responsive to one or more requests.

System 100 may include one or more networks 106. In some examples, network 106 may be one or more of a wireless network, a wired network or any combination of wireless network and wired network and may be configured to connect client device 104 to communication server 108 may connect the client device 104 to the authentication server 110 or connect the communication server 108 to the authentication server 110. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more communication servers 108. In some examples, communication server 108 may include one or more processors, which are coupled to memory. The communication server 108 may be configured as a central system, server or platform to control and call various data at different times to execute a plurality of workflow actions. communication server 108 may be configured to connect to the one or more databases. The communication server 108 may be connected to at least one client device 104 and authentication server 110. In one example, the communication server includes a comprehensive software and hardware infrastructure designed to manage and handle incoming and outgoing phone calls in a call center environment. This system typically integrates various telecommunication features, such as automatic call distribution (ACD), interactive voice response (IVR) systems, and computer telephony integration (CTI), to efficiently route, monitor, and manage large volumes of customer calls. In embodiments discussed herein the communication server 108 can receive encrypted data, process the encrypted data, and route the encrypted data for authentication, e.g., to the authentication server 110 to authenticate one or more user accounts associated with the encrypted data.

System 100 may include one or more authentication servers 110. In some examples, authentication server 110 may include one or more processors, which are coupled to memory. The authentication server 110 may be configured to receive a request from communication server 108 to verify an authentication code or encrypted data received in a message from communication server 108. For example, as part of a communication established between the client device 104 and communication server 108, the client device 104 may transmit encrypted data to the communication server 108, which then sends the encrypted data to the authentication server 110 to decrypt and verify, based on the decrypted data, an identity of a user that initiated the communication on the client device 104. The authentication server 110, in response to the identity of the user being validated, may send a communication back to the communication server 108 indicating validation of the identity of the user.

Figure 2:
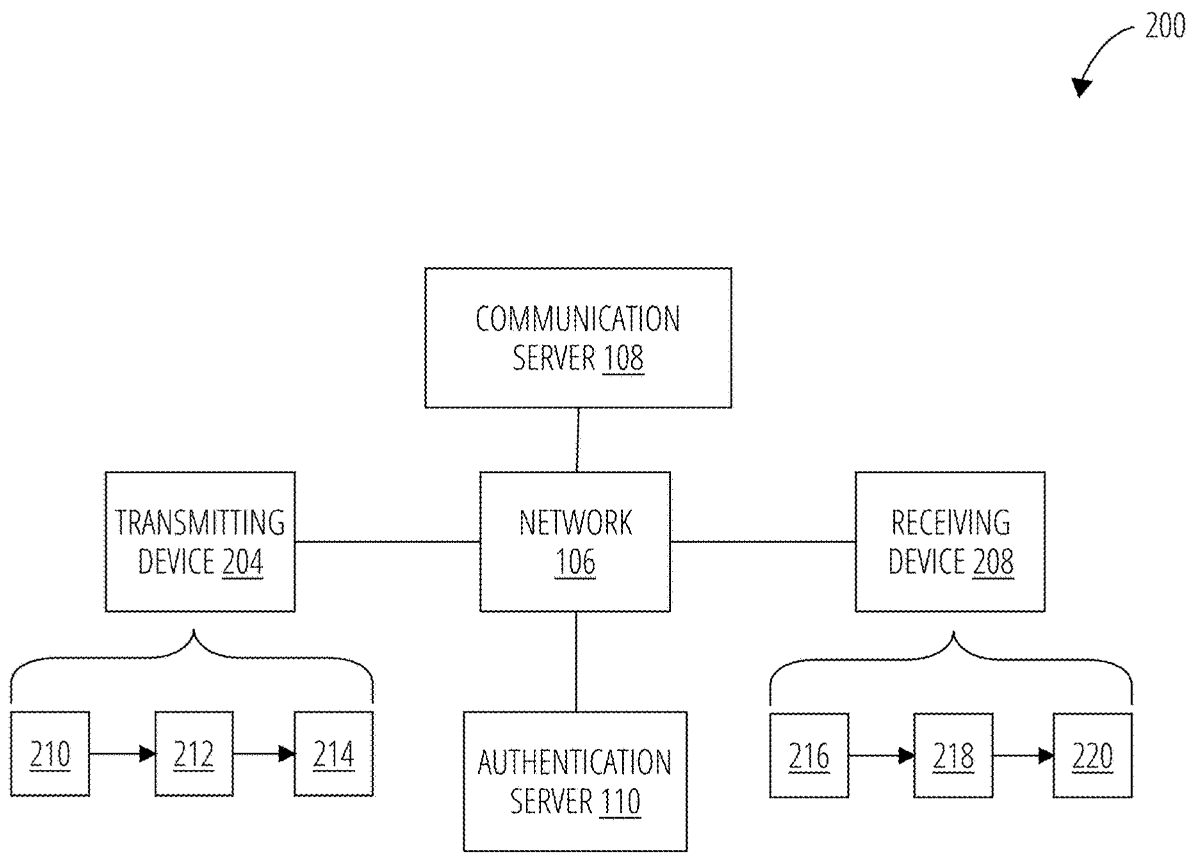
FIG. 2 illustrates another aspect of the data transmission system in accordance with one embodiment.

FIG. 2 illustrates a data transmission system according to an example embodiment. System 200 may include a transmitting device 204, a receiving device 208 in communication, for example via network 206, with one or more servers such as authentication server 110 and communication server 108 as described with respect to FIG. 1. Transmitting or transmitting device 204 may be the same as, or similar to, contactless card 102 discussed above with reference to FIG. 1. Receiving device 208 may be the same as, or similar to, client device 104 discussed above with reference to FIG. 1. Network 206 may be similar to network 106 discussed above with reference to FIG. 1. communication server 108 may be the same as or similar to communication server 108 discussed above with reference to FIG. 1. Authentication server 110 may be the same as or similar to authentication server 110 discussed above with reference to FIG. 1. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be compromised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby it reduces exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 204 and 208. As explained above, although single instances of transmitting device 204 and receiving device 208 may be included, it is understood that one or more transmitting devices 204 and one or more receiving devices 208 may be involved so long as each party shares the same shared secret symmetric key. In some examples, the transmitting device 204 and receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and receiving device 208 may be provided with the same master symmetric key, and further that part of the data exchanged between the transmitting device 204 and receiving device 208 comprises at least a portion of data which may be referred to as the counter value. The counter value may comprise a number that changes each time data is exchanged between the transmitting device 204 and the receiving device 208.

System 200 may include one or more networks 206. In some examples, network 206 may be one or more of a wireless network, a wired network or any combination of wireless network and wired network and may be configured to connect one or more transmitting devices 204 and one or more receiving devices 208 to server 202. For example, network 206 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, Wi-Fi, and/or the like.

In addition, network 206 may include, without limitation, telephone lines, fiber optics, IEEE Ethernet 802.3, a wide area network, a wireless personal area network, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other. Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through network 206. For example, communication between the one or more transmitting devices 204 and the one or more receiving devices 208 may occur via at least one of NFC, Bluetooth, RFID, Wi-Fi, and/or the like.

As described herein, in some embodiments of the present disclosure, one of the functions of the transmitting device 204 (e.g., contactless card 102) includes transmitting encrypted data to the receiving device 208 (e.g., client device 104 from FIG. 1). The encrypted data is an encrypted message including at least a uniform resource identifier (URI) and an authentication code. The URI is used by a device, such as receiving device 208, for generating a communication with another device such as communication server 108. The authentication code is an encrypted code within the encrypted data that is assigned to the transmitting device 204 as a unique code used to verify an identity of the user account associated with the transmitting device 204. Hereinafter, when referring to the URI portion of the message discussed above, alone, the term "URI" will be used. When referring to the unique authentication code, the term "authentication code" or "encrypted data" will be used. That is, the phrase "encrypted data" can refer both to the message sent by the transmitting device 204 to the receiving device 208 that includes the combination of the URI and the authentication code, or it can just refer to the authentication code. The URI can be used by the receiving device 208 to initiate a communication, such as a phone call, with a communication server 108, such as one operating at a call center. In such embodiments, the transmitting device 204 transmits the encrypted data, including the URI and the authentication code, to the receiving device 208. The authentication code of the encrypted data, from the transmitting device 204 can be sent to the authentication server 110 which decrypts the authentication code and compares the decrypted authentication code to an expected authentication code associated with the user account of the transmitting device 204 to determine if the user is authorized to initiate or generate the communication to the communication server 108.

For example, a user intends to call a call center system to obtain a service, for example, customer service, to attend to an issue. The call center system is associated with the communication server 108 and either is in communication with the authentication server 110 or otherwise controls the authentication server 110. In this example, the call center system may only accept the call if the user attempting to communicate with the call center system, via the communication server 108, is a subscriber to the call center system or is otherwise authorized to speak with agents of the call center system. In order to facilitate verification or authentication that the user or user account is authorized to communicate with the call center system, the transmitting device 204 sends the receiving device 208 an authentication code as part of the encrypted data described above. The authentication code sent to the receiving device 208 is then forwarded to the communication server 108 during initiation of the communication between the receiving device 208 and the communication server 108. The communication server 108 is then to communicate the authentication code to the authentication server 110 which decrypts the authentication code, and verifies, based on the decrypted authentication code that the user account associated with the transmitting device 204 is allowed to communicate with the call center system via the communication server 108.

Although the above example describes the embodiment with reference to a call center system, any suitable establishment for receiving communications is contemplated by the present disclosure.

In some embodiments, the transmitting device 204 is the contactless card 102 and the receiving device 208 is the client device 104, for example, a mobile device or smart phone, from FIG. 1. The user may initiate a communication through a mobile application on the client device 104, and the mobile application will trigger an indication on the client device 104 for the user to tap their contactless card 102 on the client device 104, and the contactless card 102 will transmit the encrypted data, including the URI and the authentication code, to the client device 104 for it to be sent to the communication server 108 and authentication server 110. The verification step can be performed before, during, or after the user initiates the communication with the call center system or other center associated with the communication server 108. For example, the application described above can be initiated by the user, and before the user is allowed to make the call, the application triggers the requirement to tap their contactless card 102.

In some embodiments, tapping of the card, and validation of the authentication code triggers the communication. For example, the user may start the application on their client device 104 and the application triggers the requirement of tapping the contactless card 102, and upon receiving the encrypted data from the contactless card 102, the client device 104 starts the communication, based on the URI in the encrypted data, with the communication server 108. However, before the call is activated whereby the user can actually speak to anyone, the authentication code of the encrypted data is validated by the authentication server 110 first. Once the authentication code is validated, then the call is allowed to continue and the user is permitted to speak with an agent of the call center system.

The encrypted data sent by the contactless card 102 to the client device 104 can include the URI described above. The user can access a mobile application on their client device 104, which indicates to the user to tap their contactless card 102 to their client device 104 (or otherwise bring the contactless card 102 in close proximity to the client device 104), and the URI can be sent from the contactless card 102 to the client device 104. The URI can be a telephone URI and it can include both data for the client device 104 to initiate the communication (i.e., start a call) to the communication server 108, and the URI can include the authentication code that is used to authorize the user account associated with the contactless card 102. In this way, the URI can be used by a telephone feature of the client device 104 to initiate the call to the communication server 108 and, in that call, it can send the authentication code as a parameter of the URI to the communication server 108 as part of generating the call.

At block 210, when the transmitting device 204 is preparing to process an authentication code (i.e., the portion of the encrypted data the authentication server 110 is to authenticate) or sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and, using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using a master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data or authentication code before transmitting the result to the receiving device 208. For example, the transmitting device 204 may encrypt the sensitive data or authentication code using a symmetric encryption algorithm using the diversified symmetric key, with the output comprising the protected encrypted data, including the URI and authentication code. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and, using a symmetric decryption algorithm along with the diversified symmetric key, decrypt the protected encrypted data.

At block 220, as a result of the decrypting the protected encrypted data, the original sensitive data may be revealed.

Alternatively, instead of the receiving device 208 performing the decryption, the receiving device 208 can receive the URI from the transmitting device 204 and the receiving device 208 initiates a communication to the communication server 108 based on the URI. In this example, the URI includes the encrypted authentication code as a segment thereof, and when the receiving device 208 generates the communication using the URI, the authentication code segment of the URI is transmitted by the receiving device 208 to the communication server 108 for the communication server 108 to decrypt or for the authentication server 110 to decrypt. In some embodiments, the URI and authentication code are encrypted together to produce the encrypted data sent from the transmitting device 204 to the receiving device 208. The receiving device 208 will decrypt the encrypted data to determine the URI and then insert the still encrypted authentication code as a parameter of the URI, and then, based on the URI, generate the communication to the communication server 108, including sending the authentication code in the URI to the communication server 108. In other embodiments, just the authentication code portion of the encrypted data is encrypted, and the URI is not encrypted, but otherwise sent with the encrypted authentication code to the receiving device 208.

As discussed in more detail herein, in some embodiments, before the encrypted data is transmitted from the transmitting device 204 to the receiving device 208, the encrypted data is converted from a hexadecimal format to a base-ten format. In some other embodiments, the encrypted data is not converted on the transmitting device 204, but is instead converted by the receiving device 208 before the receiving device 208 generates the communication to the communication server 108.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and receiving device 208 may independently produce the same diversified symmetric key. This diversified symmetric key, not the master symmetric key, is used to protect the sensitive data.

As explained above, both the transmitting device 204 and receiving device 208 each initially possess the shared master symmetric key. The shared master symmetric key is not used to encrypt the original sensitive data. Because the diversified symmetric key is independently created by both the transmitting device 204 and receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and therefore a new diversified symmetric key. In an embodiment, a new diversification value and therefore a new diversified symmetric key may be created for every exchange between the transmitting device 204 and receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
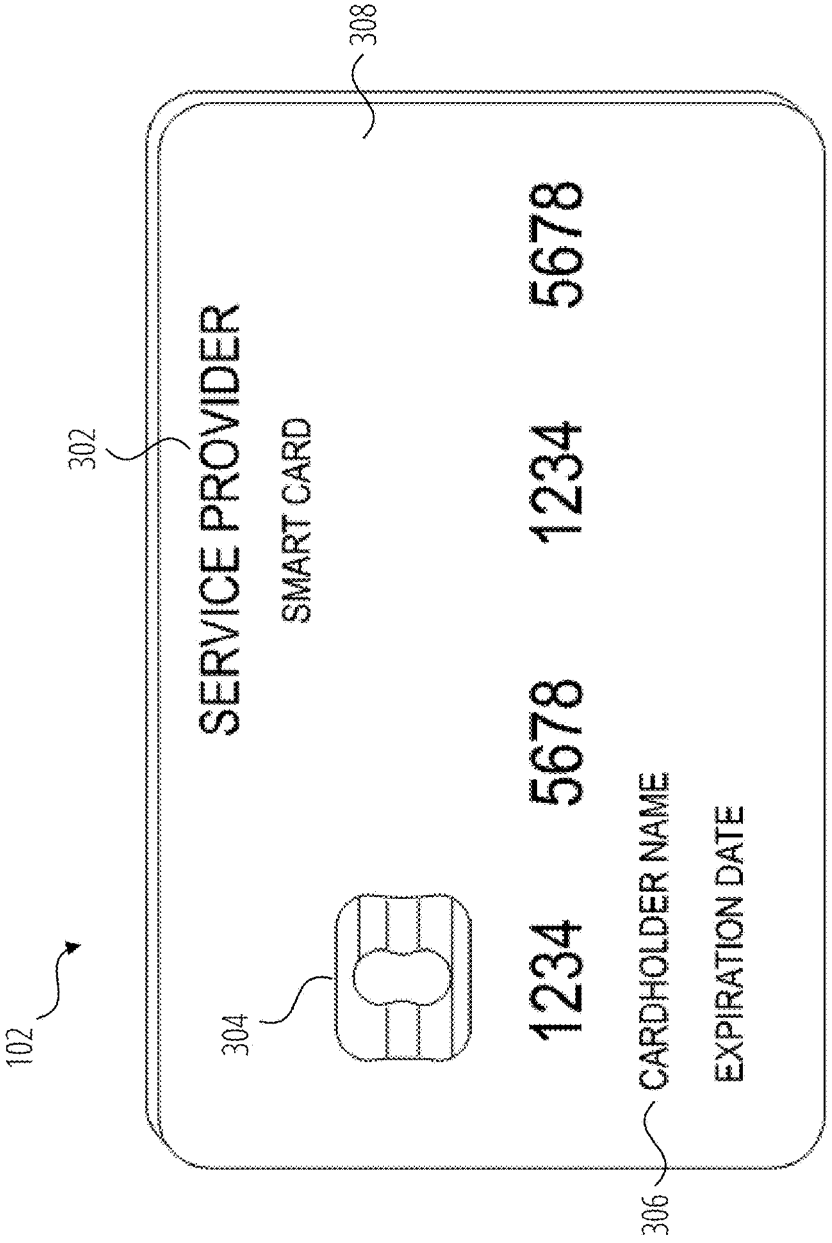
FIG. 3 illustrates a contactless card in accordance with one embodiment.

FIG. 3 illustrates an example configuration of a contactless card 102, which may include a contactless card, a payment card, such as a credit card, debit card, or gift card, issued by a service provider as displayed as service provider indicia 302 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 306 displayed on the front and/or back of the card, and a contact pad 304. The contact pad 304 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 4. These components may be located behind the contact pad 304 or elsewhere on the substrate 308, e.g. within a different layer of the substrate 308, and may electrically and physically coupled with the contact pad 304. The contactless card 102 may also include a magnetic strip or tape, which may be located on the back of the card (not shown in FIG. 3). The contactless card 102 may also include a Near-Field Communication (NFC) device coupled with an antenna capable of communicating via the NFC protocol. Embodiments are not limited in this manner.

Figure 4:
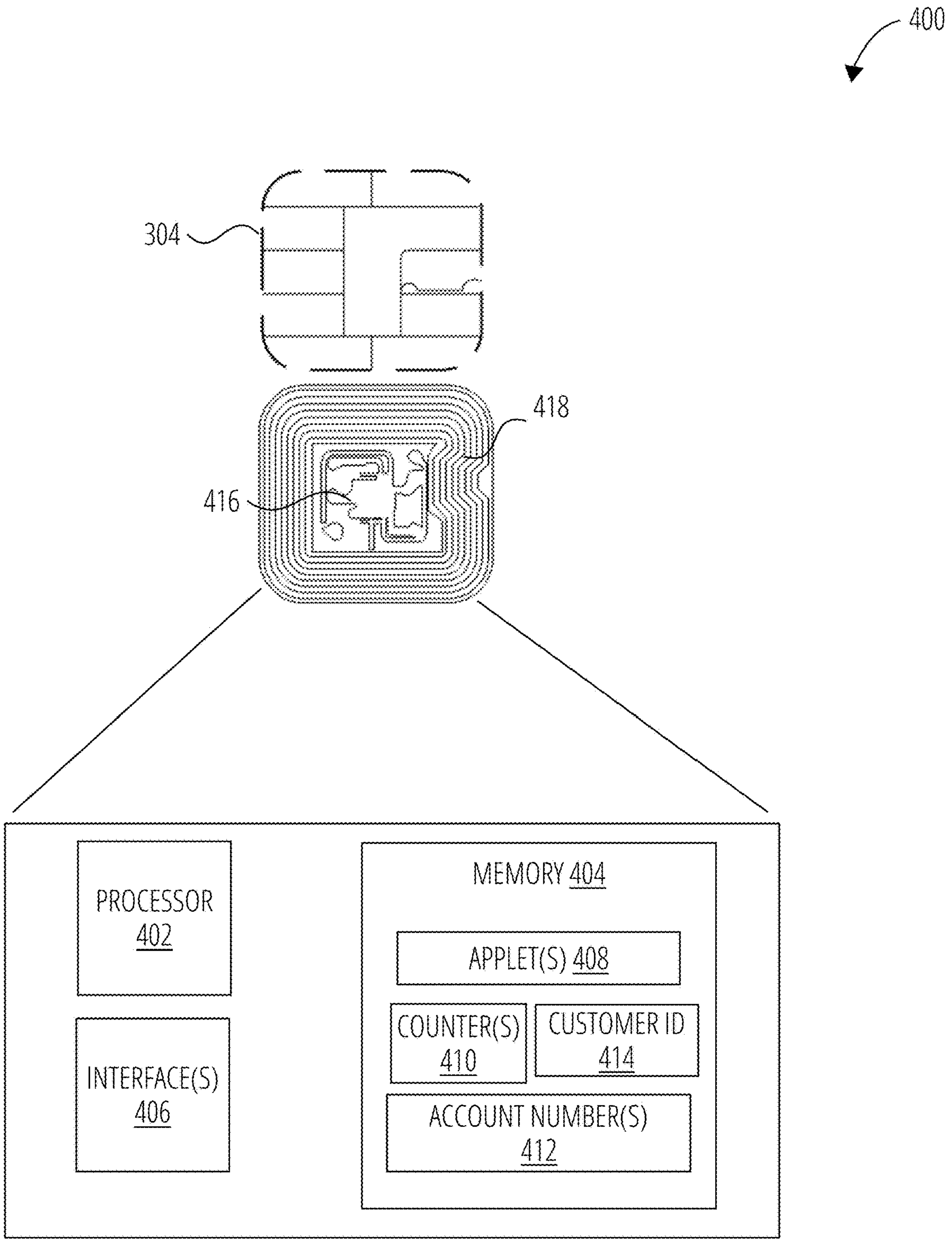
FIG. 4 illustrates a transaction card component in accordance with one embodiment.

FIG. 4 illustrates various circuitry transaction card components 400 of the contactless card 102. As illustrated in FIG. 4, the contact pad 304 of contactless card 102 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, security primitives and tamperproofing hardware, as necessary to perform the functions described herein.

The memory 404 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypt data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer. The customer identifier 414 may comprise a unique alphanumeric identifier assigned to a user of the contactless card 102, and the identifier may distinguish the user of the contactless card from other contactless card users. In some examples, the customer identifier 414 may identify both a customer and an account assigned to that customer and may further identify the contactless card 102 associated with the customer's account. As stated, the account number(s) 412 may include thousands of one-time use virtual account numbers associated with the contactless card 102. An applet(s) 408 of the contactless card 102 may be configured to manage the account number(s) 412 (e.g., to select an account number(s) 412, mark the selected account number(s) 412 as used, and transmit the account number(s) 412 to a mobile device for autofilling by an autofilling service.

The processor 402 and memory elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 102 and authentication server 110 may include certain data such that the card may be properly identified. The contactless card 102 may include one or more unique identifiers (not pictured). Each time a read operation takes place, the counter(s) 410 may be configured to increment. In some examples, each time data from the contactless card 102 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 101 is unable to determine the application transaction counter(s) 410 since there is no communication between applet(s) 408 on the contactless card 102.

In some examples, the counter(s) 410 may get out of sync. In some examples, to account for accidental reads that initiate transactions, such as reading at an angle, the counter(s) 410 may increment but the application does not process the counter(s) 410. In some examples, when the client device 104 is woken up, NFC may be enabled and the client device 104 may be configured to read available tags, but no action is taken responsive to the reads.

To keep the counter(s) 410 in sync, an application, such as a background application, may be executed that would be configured to detect when the client device 104 wakes up and synchronize with the server of a banking system indicating that a read that occurred due to detection to then move the counter(s) 410 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it is possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The encrypted data, including the URI and the authentication code, may be delivered as the content of a text NDEF record in hexadecimal ASCII format. In another example, the NDEF record may be encoded in base-ten ASCII format.

However, in some embodiments, the URI with the authentication code is transmitted in base-ten ASCII format so that it can be interpreted by a device with a telephone calling feature, such as a phone, smart phone, mobile device, or other suitable device.

In order to send the URI with the authentication code in base-ten format, the transaction card components 400 are configured to convert the content of the encrypted data, including either or both of the URI and the authentication code, from hexadecimal ASCII format to base-ten ASCII format so that it can be properly interpreted by the device initiating the communication (e.g., to dial the authentication code as part of a dial entry to make a phone call to the communication server 108). If the transaction card component 400 is not to perform the conversion, and instead, the client device 104 is to perform the conversion, the URI with authentication code is sent from the transaction card component 400 to the client device 104 in hexadecimal format.

To accomplish this, in some embodiments, the contactless card 102 is configured to transcode, by the processor 402 of contactless card 102, the encrypted data (e.g., the URI including the authentication code or just the authentication code if the URI portion of the message is already in base-ten ASCII format) into transcoded data, the encrypted data generated based on one or more cryptographic algorithms and one or more session keys generated from a diversified key stored on the contactless card 102. In some embodiments, transcoding the encrypted data includes accessing, by the processor circuit (e.g., processor 402), the encrypted data, converting the encrypted data into a corresponding numeric data stream (e.g., converting from hexadecimal ASCII to base-ten ASCII), and then inserting characters into the corresponding numeric data stream to indicate data separation in the transcoded data.

Figure 13:
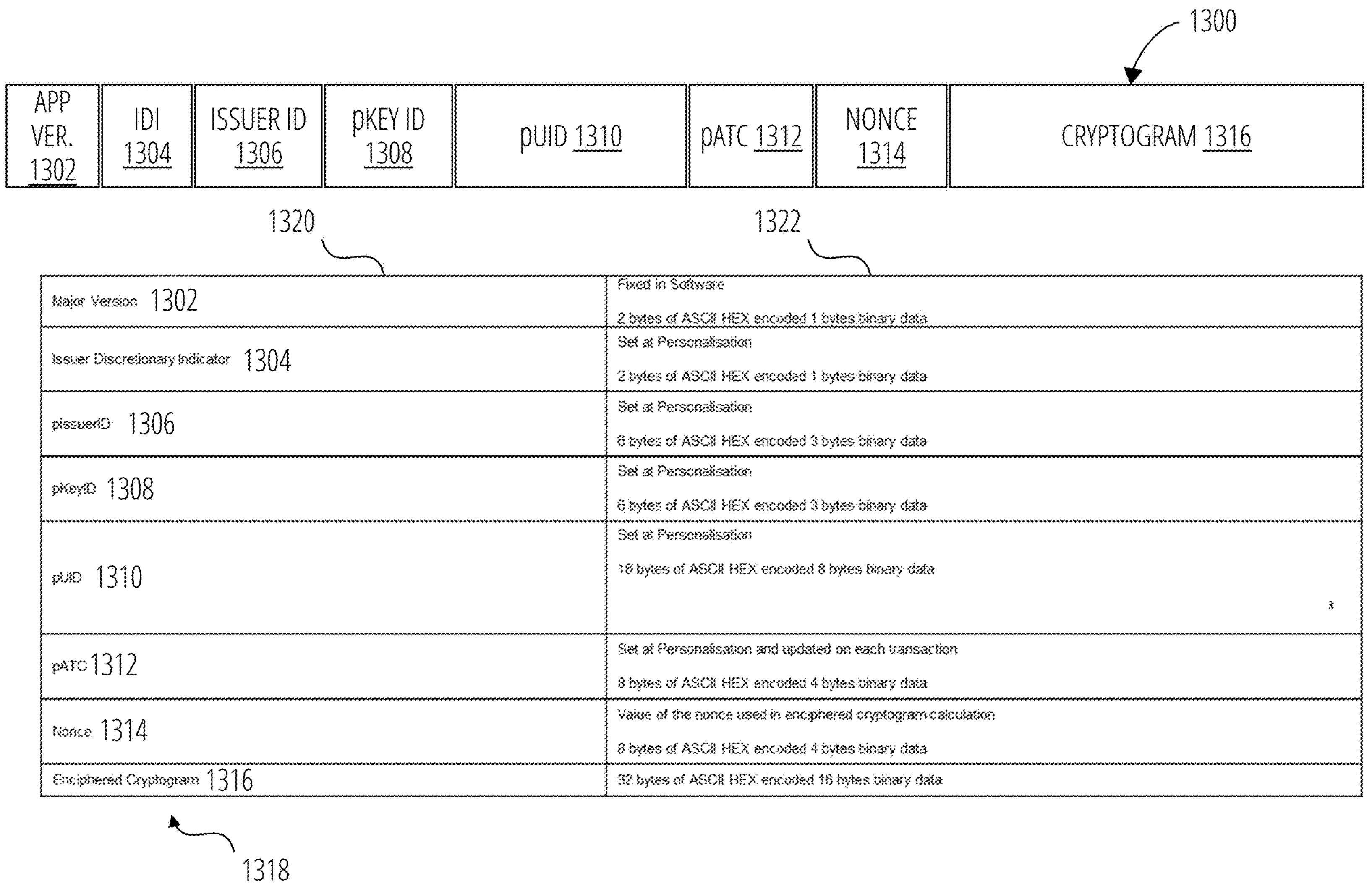
FIG. 13 illustrates an example message format in accordance with one embodiment.

In some embodiments, converting the encrypted data to the corresponding numeric data stream includes the processor 402 being configured to use a conversion algorithm that converts a first portion of the encrypted data to a base-ten representation of the first portion. For example, the encrypted data sent from the contactless card 102 to the client device 104 may include a data stream having more than one section, each section being associated with a different purpose (e.g., see the different fields of the message 1300 in FIG. 13; this is an example of a message sent from contactless card 102 to client device 104 that includes the encrypted data). One section or field of the message or encrypted data is the first portion that is converted to a base-ten representation. In some embodiments, the processor 402 is then to insert the base-ten representation of the first portion into a uniform resource identifier (URI) for a communication to be made by the client device 104. In some embodiments, as shown in FIG. 13, the message or encrypted data includes a plurality of sections, fields, or portions, in which case, the processor 402 is to use the conversion algorithm to convert a second portion of the encrypted data to a base-ten representation of the second portion and insert the base-ten representation of the second portion into the URI for the communication after the base-ten representation of the first portion.

In some embodiments, the processor 402 is further to insert a character between the base-ten representation of the first portion and the base-ten representation of the second portion to indicate separation between the base-ten representation of the first portion and the base-ten representation of the second portion (e.g., separate fields of the encrypted data that has been converted to the base-ten representation). In some embodiments, the character inserted to indicate separation between the fields includes "#" or "*".

In some embodiments, the encrypted data or the message being sent from the contactless card 102 to the client device 104 includes the URI or other data that may include one or more portions, each portion of the one or more portions including a hexadecimal value or a base-ten value. In some embodiments, the processor 402 is to convert any of the one or more portions that include a hexadecimal value to a corresponding base-ten value, and leaving unchanged any of the one or more portions that include a base-ten value.

Finally, once the processor 402 has converted the encrypted data to the corresponding numeric data stream (i.e., converted the hexadecimal portions of the encrypted data into a base-ten representation of the encrypted data), the processor 402 of the contactless card 102 is to transmit, via the communication interface(s) 406 of the contactless card 102, the transcoded data (i.e., the numeric data stream) to a mobile device (e.g., client device 104) associated with a user account of the contactless card 102. In some embodiments, the processor 402 is to store the encrypted data on or in the memory 404 of the contactless card 102 for later use and transmission. For example, if the communication to from the client device 104 to the communication server 108 fails and the user needs to redo the communication, the encrypted data may be quickly obtained and sent again to the client device 104 without having to perform any complex processing or data conversion.

Figure 5:
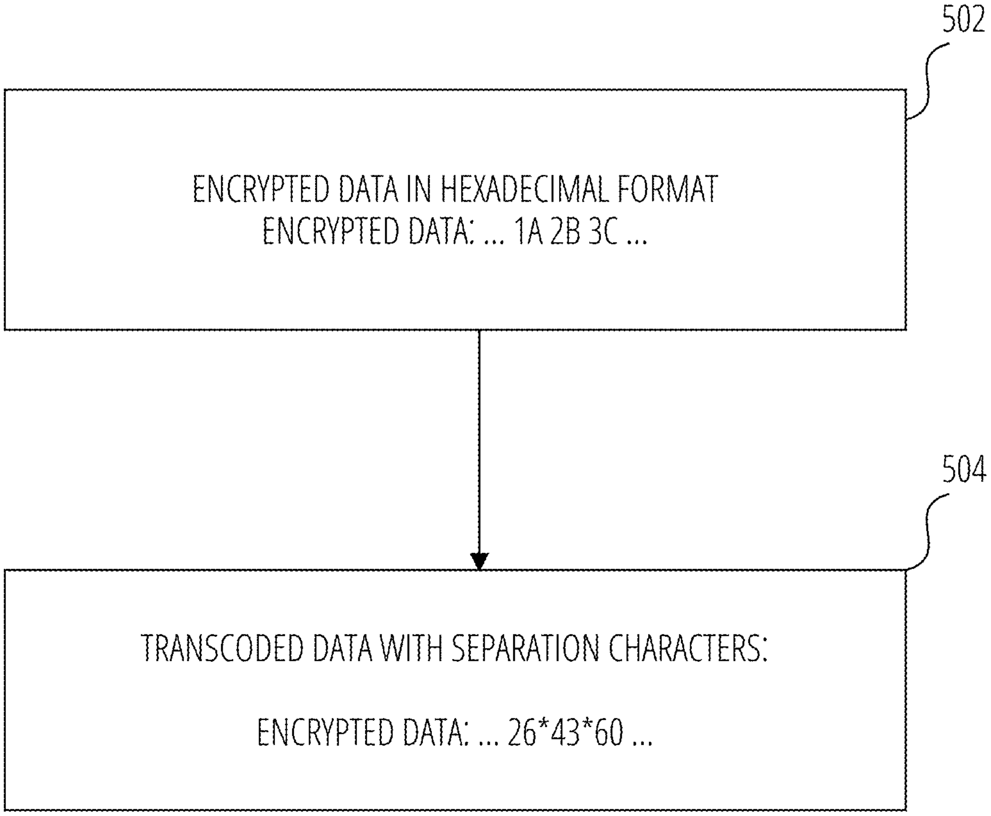
FIG. 5 illustrates a conversion aspect of the subject matter in accordance with one embodiment.

FIG. 5 illustrates a transcoding example 500 according one embodiment, whereby sections of the encrypted data may be transcoded. As shown in FIG. 5, three sections of encrypted data at block 502 are shown, namely a first portion or field with data "1A", a second portion or field with data "2B", and a third portion or field with data "3C", all in hexadecimal format. The encrypted data, including the three portions, and potentially one or more other portions or fields, is then transcoded as described hereinabove. The transcoded data shown in block 504 shows the three different portions converted from hexadecimal to a base-ten representation of the respective portion, with a character, namely "*" (any suitable character, such as "*", "#", ",", ",", ".", or any other character may be used) inserted to show separation. For example, as shown in block 504, the first portion or field was converted from "1A" in hexadecimal to "26" in base-ten because "26" is the base-ten equivalent of hexadecimal "1A". The second and third portions or fields are also converted accordingly. Again, FIG. 13 provides a better illustration of a message including example encrypted data with various fields shown. However, the example in FIG. 5 illustrates a simplified version of the transcoding.

The contactless card 102 may need to transcode just the authentication code or transcode both the authentication code and the URI. Again, the contactless card 102 may not perform this transcoding, and instead, the client device 104 performs the transcoding before the client device 104 can generate the communication. In any event, the conversion/transcoding is performed so that an application (e.g., telephone application) on the client device 104 can interpret the encrypted data and dial it as a telephone string.

In some embodiments, a field may have leading zeros. For example, a hexadecimal field may include the code "009B". While this may be converted to "155" in base-ten, the leading zeros before 009B may be important to include as part of the authentication code. As such, as part of the conversion, the contactless card 102 or the client device 104, whichever is doing the conversion, will have to indicate any leading zeros based on a size of the hexadecimal number. For example, the hexadecimal number "009B" is equivalent to a 16-bit binary number. A 16-bit binary number can range from base-ten "0" to base-ten 216-1 or "65535". So, a 16-bit binary number, or 4 digit hexadecimal number, can range in base-ten from "0" to "65,535". The device performing the conversion can accommodate hexadecimal leading zeros by adding zeros in the base-ten representation of the number as well. For example, hexadecimal number "009B" can be converted to a base-ten representation of "00155" and this will inform any recipient that the total length of the number in binary is 16 bits, and 16 bits of binary is represented by 4 digits in hexadecimal.

Alternatively, instead of adding leading zeros, the contactless card 102 could convert the hexadecimal representation of the number to base-ten, and follow the base-ten number with a length that the number was in hexadecimal. As described herein, the number and the length of the number can be separated using a character, such as "*" or "#". So, in this example, the conversion of the authentication code can include "155" as the base-ten representation of the hexadecimal number that was converted, and then a "*" or "#" is inserted, followed by length of "4" indicating that the hexadecimal representation of "155" has 4 hexadecimal digits. Therefore a system would be able to reconvert the converted message from "155" in base-ten to "009B" in hexadecimal because "9B" is "155" in hex and since the length is "4", 2 leading zeros are needed on the hexadecimal representation to make the "9B" 4 total hexadecimal digits.

Figure 6:
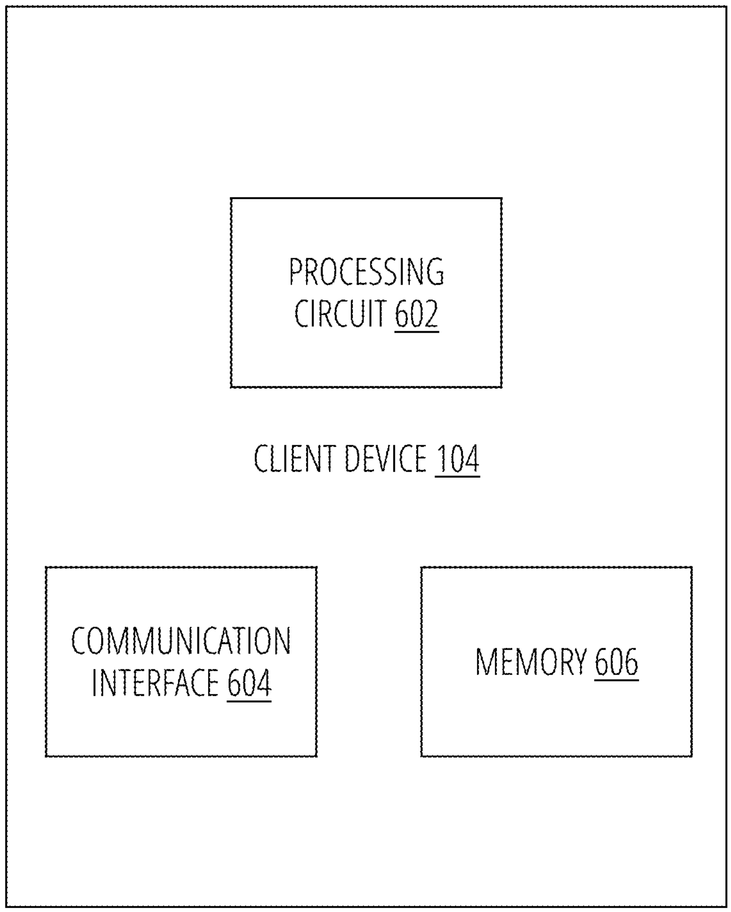
FIG. 6 illustrates a block diagram of an example client device in accordance with one embodiment.

As illustrated in FIG. 6, in some embodiments of the present disclosure, instead of the contactless card 102 performing the transcoding of the encrypted data from hexadecimal to a base-ten representation, an apparatus such as the client device 104 performs the transcoding. For example, the client device 104 can include a processing circuit 602, a communication interface 604, and a memory 606 to store instructions thereon. The processing circuit 602 of the client device 104 is to execute the instructions, which, when executed by the processing circuit, cause the client device 104 to receive, via the communication interface of the apparatus, encoded data as described hereinabove. The encoded data can include a URI with an authentication code (e.g., encrypted authentication code) or data in hexadecimal format. The processing circuit 602 is to receive the encrypted data from a contactless card 102 in response to the client device 104 initiating a communication (e.g., starting a mobile application on their client device 104 that then triggers a request to receive input at the client device 104 from the contactless card 102) to a communication server 108 and in response to the client device 104 being brought into proximity to the contactless card 102.

In response to the client device 104 receiving the encrypted data in hexadecimal format from the contactless card 102, the processing circuit 602 is to transcode the encrypted data, including at least a portion of the URI, if the URI is in hexadecimal format, into base-ten format so that a communication can be generated by the client device 104 to the communication server 108 according to the URI and encrypted data (e.g., authentication code) received from the contactless card 102. That is, the client device 104 receives a message from the contactless card 102, the message including the URI and the authentication code and determines how to generate the communication based on the URI received from the contactless card 102. In some embodiments, the client device 104 may have to decrypt the URI and the authentication code. Once either or both of the URI and authentication code are transcoded from the message received from the contactless card 102, the client device 104 is to automatically generate or initiate the communication to the communication server 108 based on the URI. As part of initiating the communication, the client device 104 will generate the communication using the URI and the authentication code. Transcoding the authentication code in base-ten format allows the client device 104 as well as the communication server 108 to be able to interpret the authentication code as a dialed number.

In some embodiments, the communication server 108 is an interactive voice response (IVR) system. In embodiments, the authentication server 110 is to decrypt the authentication code, but it is expecting the authentication code in hexadecimal format. As such, in some embodiments, the communication server 108 or the IVR system is to convert the transcoded data back into the hexadecimal format of the authentication code and then transmit the hexadecimal format version of the authentication code to the authentication server 110 for verification. The authentication code from the encrypted data is used to authenticate the apparatus or client device 104 as being associated with the user account of the contactless card 102.

Figure 7:
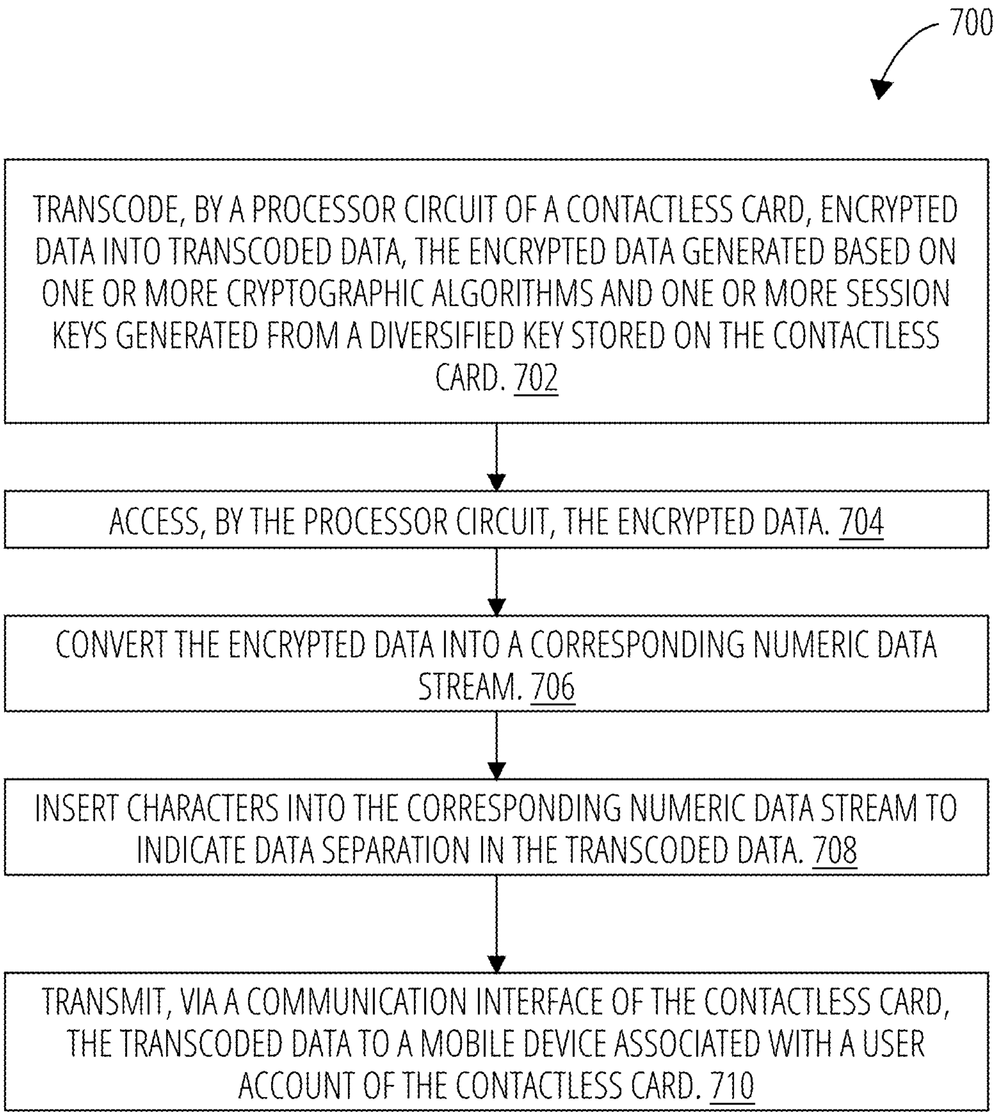
FIG. 7 illustrates a method in accordance with one embodiment.

FIG. 7 describes a method 700 for processing encrypted data, such as the URI or authentication code described above, to authenticate a user account for accessing call center system or other services of an enterprise. As shown at block 702, method 700 includes transcoding, by a processor circuit of a contactless card, encrypted data into transcoded data, the encrypted data being generated based on one or more cryptographic algorithms and one or more session keys generated from a diversified key stored on the contactless card. As shown at block 704, in some embodiments, transcoding the encrypted data includes accessing, by the processor circuit, the encrypted data. In some embodiments, as shown at block 706, transcoding the encrypted data further includes converting the encrypted data into a corresponding numeric data stream. In some embodiments, as shown at block 708, transcoding the encrypted data further includes inserting characters into the corresponding numeric data stream to indicate data separation in the transcoded data. In some embodiments, as shown at block 710, the method 700 includes transmitting, via a communication interface of the contactless card, the transcoded data to a mobile device associated with a user account of the contactless card. The transcoded data is then received by the mobile device and the communication is generated as described herein. The transcoded encrypted data is then decoded back to its original form and sent to an authentication server for authentication of the user account. Once the user account is authenticated, a message is sent from the authentication server to a voice server to permit the communication to proceed.

Figure 8:
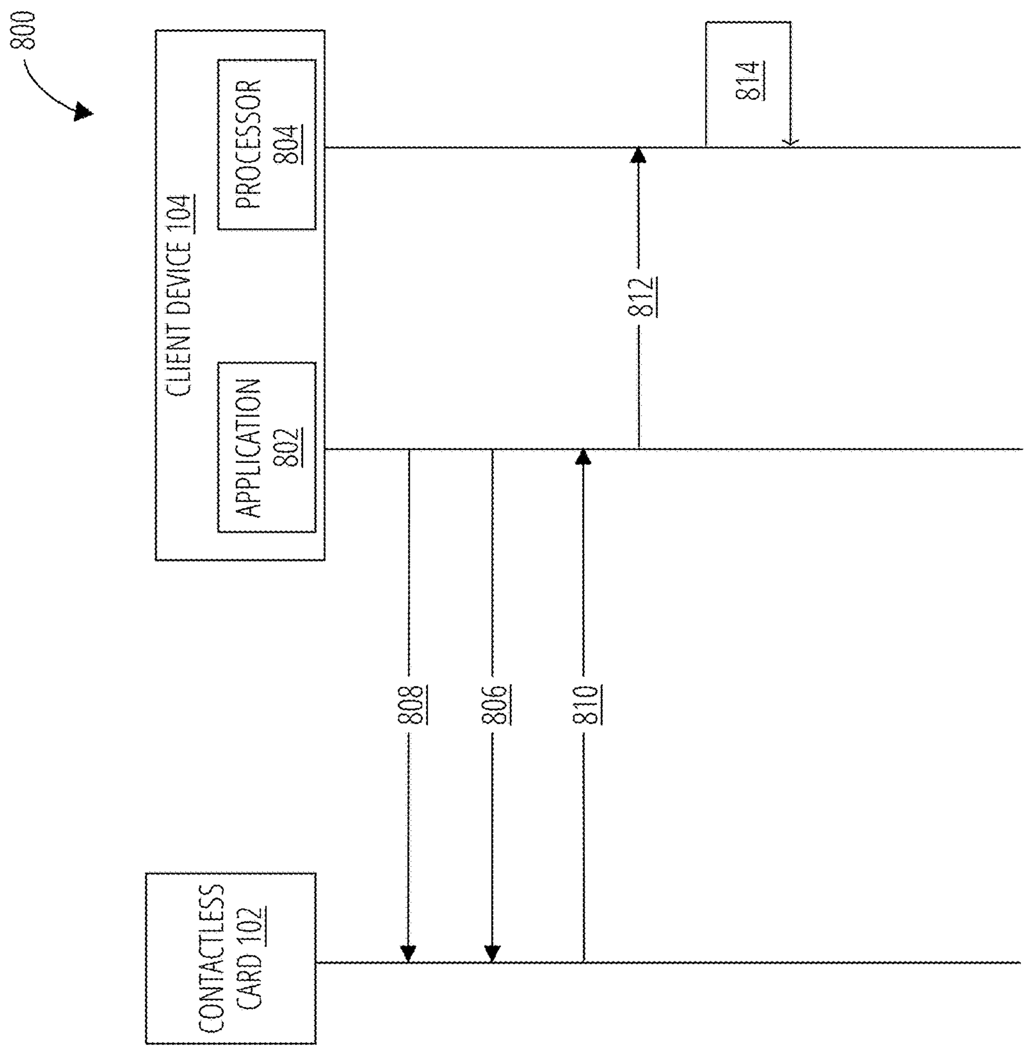
FIG. 8 illustrates a sequence flow in accordance with one embodiment.

FIG. 8 is a timing diagram illustrating an example sequence for providing authenticated access according to one or more embodiments of the present disclosure. Sequence flow 800 may include contactless card 102 and client device 104, which may include an application 802 and processor 804. In some embodiments, FIG. 8 illustrates how the message or encrypted data described above is communicated between the contactless card 102 and the client device 104.

At line 808, the application 802, such as an application discussed above that is to initiate and generate a communication (e.g., a telephone call) to the communication server 108, communicates with the contactless card 102 (e.g., after being brought near the contactless card 102). Communication between the application 802 and the contactless card 102 may involve the contactless card 102 being sufficiently close to a card reader (not shown) of the client device 104 to enable NFC data transfer between the application 802 and the contactless card 102.

At line 806, after communication has been established between client device 104 and contactless card 102, contactless card 102 generates a message authentication code (MAC) cryptogram. In some examples, this may occur when the contactless card 102 is read by the application 802. In particular, this may occur upon a read, such as an NFC read, of a near field data exchange (NDEF) tag, which may be created in accordance with the NFC Data Exchange Format. For example, a reader application, such as application 802, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message, may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, which make up the encrypted data described herein, and includes the URI and the authentication code described above. In embodiments where the contactless card 102 performs the conversion from hexadecimal to base-ten, the encrypted data (i.e., cryptogram with concatenated header) is encoded in ASCII base-ten format and returned in NDEF message format (responsive to the "Read NDEF file" message). In embodiments where the client device 104 performs the conversion, the encrypted data is encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator/identifier (URI) (e.g., as a formatted string) as described herein. In some examples, application 802 may be configured to transmit a request to contactless card 102, the request comprising an instruction to generate a MAC cryptogram.

At line 810, the contactless card 102 sends the MAC cryptogram (i.e., the encrypted data as encoded or transcoded) to the application 802. In some examples, the transmission of the MAC cryptogram occurs via NFC, however, the present disclosure is not limited thereto. In other examples, this communication may occur via Bluetooth, Wi-Fi, or other means of wireless data communication. At line 812, the application 802 communicates the MAC cryptogram to the processor 804.

At line 814, the processor 804 verifies the MAC cryptogram pursuant to an instruction from the application 802. For example, the MAC cryptogram may be verified, as explained below. In some examples, verifying the MAC cryptogram may be performed by a device other than client device 104, such as a server of a banking system in data communication with the client device 104. Verifying the MAC cryptogram can also be performed by other devices such as authentication server 110. In some embodiments, processor 804 may output the MAC cryptogram for transmission to the server of the banking system or authentication server 110, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 9:
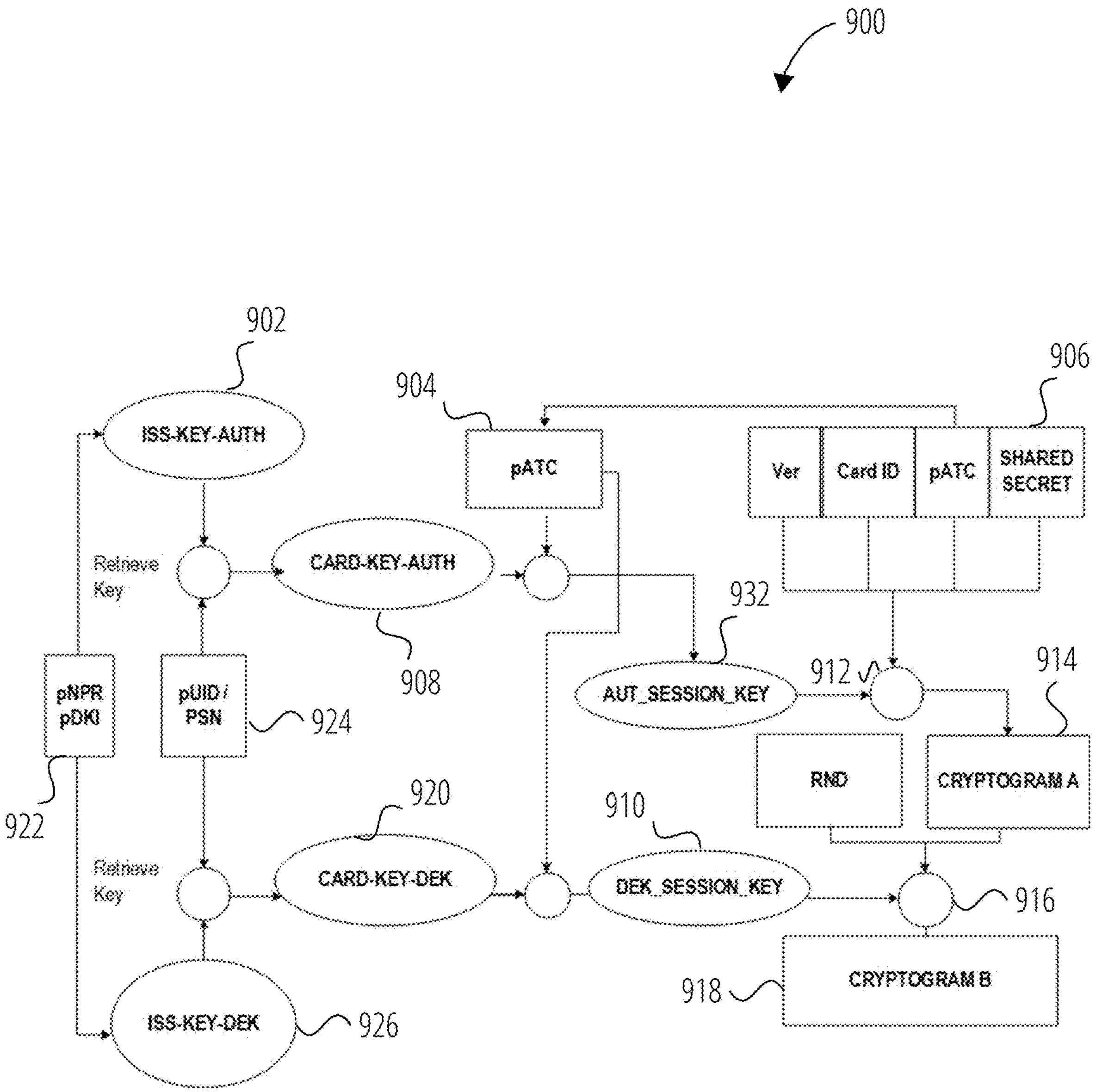
FIG. 9 is a diagram of a key generation system according to an example embodiment.

FIG. 9 illustrates a diagram of a system 900 configured to implement one or more embodiments of the present disclosure. The following description of FIG. 9 details one example of how the authentication code of the encrypted data can be created by the contactless card 102. As explained below, during the contactless card 102 creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 902, 926 may be required for each part of the portfolio on which the one or more applets is issued. For example, the first master key 902 may comprise an Issuer Cryptogram Generation/Authentication Key (Iss-Key-Auth) and the second master key 926 may comprise an Issuer Data Encryption Key (Iss-Key-DEK). As further explained herein, two issuer master keys 902, 926 are diversified into card master keys 908, 920, which are unique for each card. In some examples, a network profile record ID (pNPR) 522 and derivation key index (pDKI) 924, as back office data, may be used to identify which Issuer Master Keys 902, 926 to use in the cryptographic processes for authentication. The system performing the authentication may be configured to retrieve values of pNPR 922 and pDKI 924 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 908 and Card-Key-Dek 920). The session keys (Aut-Session-Key 932 and DEK-Session-Key 910) may be generated by the one or more applets and derived by using the application transaction counter (pATC) 904 with one or more algorithms. To fit data into the one or more algorithms, only the 2 low order bytes of the 4-byte pATC 904 is used. In some examples, the four byte session key derivation method may comprise: F1: =PATC (lower 2 bytes)||'F0'||'00'||PATC (four bytes) F1: =PATC(lower 2 bytes)||'0F'||'00'||PATC (four bytes) SK: ={(ALG (MK) [F1])||ALG (MK) [F2]}, where ALG may include 3DES ECB and MK may include the card unique derived master key.

As described herein, one or more MAC session keys may be derived using the lower two bytes of pATC 904 counter. At each tap of the contactless card, pATC 904 is configured to be updated, and the card master keys Card-Key-AUTH 508 and Card-Key-DEK 920 are further diversified into the session keys Aut-Session-Key 932 and DEK-Session-KEY 910. pATC 904 may be initialized to zero at personalization or applet initialization time. In some examples, the pATC counter 904 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 932. The data specified in cryptogram n may be processed with javacard.signature method: ALG_DES_MAC8_ISO9797_1_M2_ALG3 to correlate to EMV ARQC verification methods. The key used for this computation may comprise a session key AUT-Session-Key 932, as explained above. As explained above, the low order two bytes of the counter may be used to diversify for the one or more MAC session keys. As explained below, AUT-Session-Key 932 may be used to MAC data 906, and the resulting data or cryptogram A 914 and random number RND may be encrypted using DEK-Session-Key 910 to create cryptogram B or output 918 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 910 derived from the Card-Key-DEK 920. In this case, the ATC value for the session key derivation is the least significant byte of the counter pATC 904.

The format below represents a binary version example embodiment. Further, in some examples, the first byte may be set to ASCII 'A.'

| Message Format | | | | | |
|---|---|---|---|---|---|
| 1 | 2 | 4 | 8 | | 8 |
| 0x43 (Message Type 'A') | Version | pATC | RND | | Cryptogram A (MAC) |
| Cryptogram A (MAC) | 8 bytes | | | | |
| MAC of | | | | | |
| 2 | 8 | 4 | 4 | 18 bytes input data | |
| Version | pUID | pATC | Shared Secret | | |

| Message Format | | | | | |
|---|---|---|---|---|---|
| 1 | 2 | 4 | | 16 | |
| 0x43 (Message Type 'A') | Version | pATC | | Cryptogram B | |
| Cryptogram A (MAC) | 8 bytes | | | | |
| MAC of | | | | | |
| 2 | 8 | 4 | 4 | | 18 bytes input data |
| Version | pUID | pATC | Shared Secret | | |
| Cryptogram B | 16 | | | | |
| Sym Encryption of | | | | | |
| 8 | 8 | | | | |
| RND | Cryptogram A | | | | |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |
| Message Format | | | | |
| 2 | 8 | 4 | | 16 |
| Version | pUID | pATC | | Cryptogram B |
| 8 bytes | | | | |
| 8 | | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The UID field of the received message may be extracted to derive, from master keys Iss-Key-AUTH 902 and Iss-Key-DEK 926, the card master keys (Card-Key-Auth 908 and Card-Key-DEK 920) for that particular card. Using the card master keys (Card-Key-Auth 908 and Card-Key-DEK 920), the counter (pATC) field of the received message may be used to derive the session keys (Aut-Session-Key 932 and DEK-Session-Key 910) for that particular card.

Cryptogram B 918 may be decrypted using the DEK-Session-KEY, which yields cryptogram A 914 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 914, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 932. The input data 906 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 912, data 906 is processed through the MAC using Aut-Session-Key 932 to produce MAC output (cryptogram A) 914, which is encrypted.

In order to provide additional protection against brute force attacks exposing the keys on the card, it is desirable that the MAC cryptogram 914 be enciphered. In some examples, data or cryptogram A 914 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 910. In the encryption operation 916, data or cryptogram A 914 and RND are processed using DEK-Session-Key 910 to produce encrypted data, cryptogram B 918. The data 914 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 10:
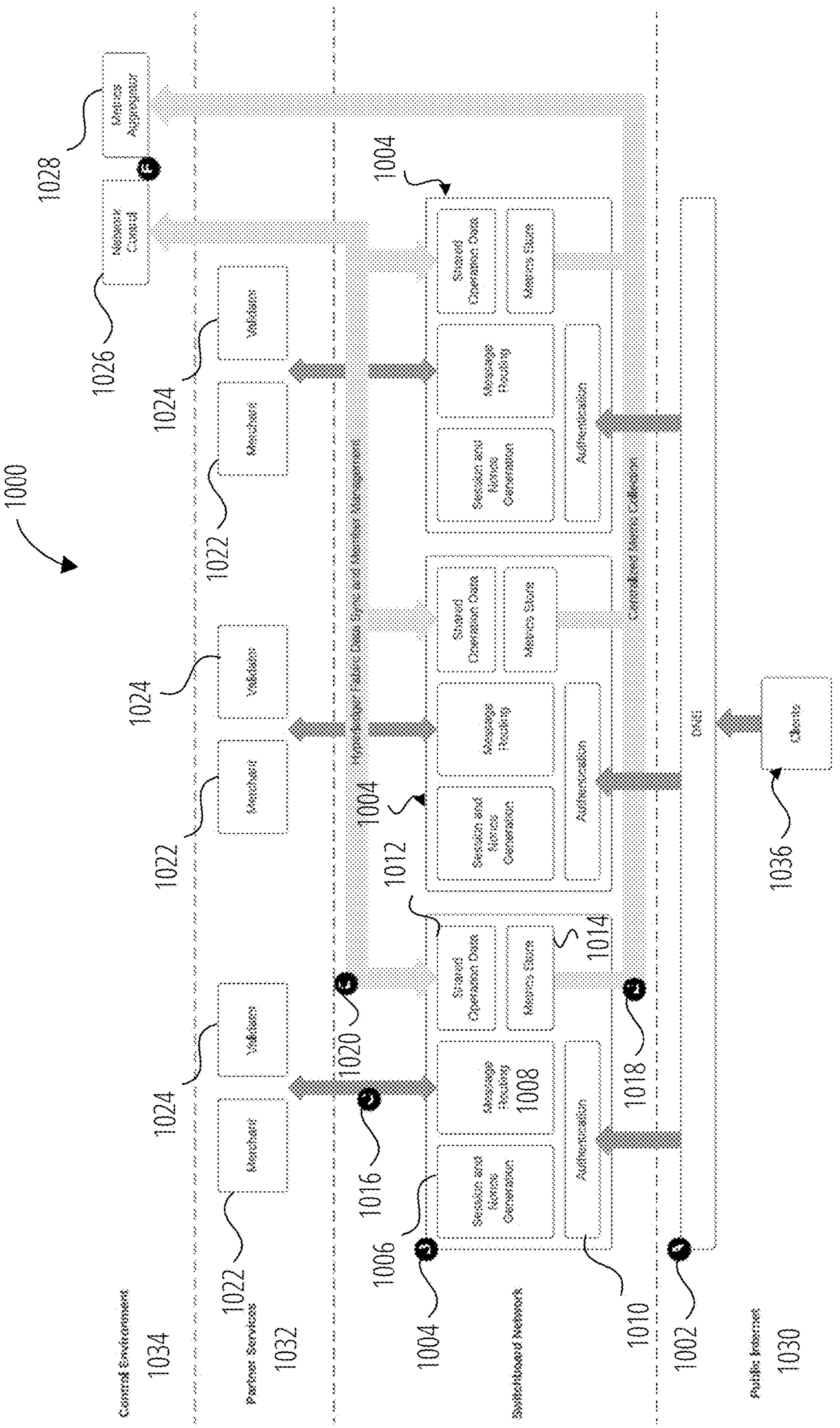
FIG. 10 illustrates an example of a system configured to operate in accordance with embodiments discussed herein.

In some instances, embodiments may be implemented in a multi-issuer environment and messages are routed through a switchboard system, such as system 1000. FIG. 10 illustrates an example of system 1000 in accordance with the embodiments discussed herein. The system 1000 includes additional devices and systems configured to enable contactless card issuers to implement tap-to-card services. Specifically, system 1000 enables any number of issuer systems to provide card services to their clients through a switching fabric, i.e., the switchboard system in a secure and safe manner. The system 1000 described herein with respect to FIG. 10 is one example implementation of network 106 illustrated in FIG. 1 and illustrates how the encrypted data described herein can be forwarded from the client device 104 to the communication server 108 or the authentication server 110.

In embodiments, the switchboard system 1000 includes one or more nodes 1004 configured to perform routing operations. As described herein, each of the one or more nodes 1004 also performs authentication functions like the authentication server 110 described above with respect to FIG. 1. In some embodiments, before sending the authentication code described above to the nodes 1004 in the system 1000, the communication server 108 will re-encode the authentication code of the encrypted data back into hexadecimal format. Each switchboard node 1004 may include a session and nonce generator 1006, a message router 1008, an authentication 1010, an operation data 1012 store, and a metrics store 1014. Further, each of the nodes may be configured the same and share configurations, but each switchboard node 1004 may independently process and route messages and requests to the appropriate systems, such as the merchant systems and issuer systems. Each of the nodes 1004 is configured to act as a broker of trust between an issuer system, the merchant system 1022, and/or validation system 1024, for example. Each switchboard node 1004 is configured to route each message to the correct issuer system while maintaining data security. For example, a switchboard node 1004 may route a message between an issuer system and a merchant system while the node cannot access the private data in the message.

The switchboard system may be configured as a server system with a collection of hardware, software, and networking components that work together to provide client services. Hardware components may include one or more server computers, storage devices, and network adapters. The server computers are configured to run server applications, such as those executable on each of the nodes 1004. In some instances, each of the server computers may be configured to operate one or more nodes, e.g., in a virtual environment. The storage devices are configured to store data that is accessed by the applications, and the network adapters are used to connect the server computer to the network.

Each of the server computers may be configured to execute software, including the operating system, the applications, and security software. The networking components of a server system include the network switch, router, and firewall. The network switch is used to connect the server computers to other devices on the network. The router is used to route traffic between different networks. The firewall is used to protect the server system from unauthorized access and attacks.

Figure 11:
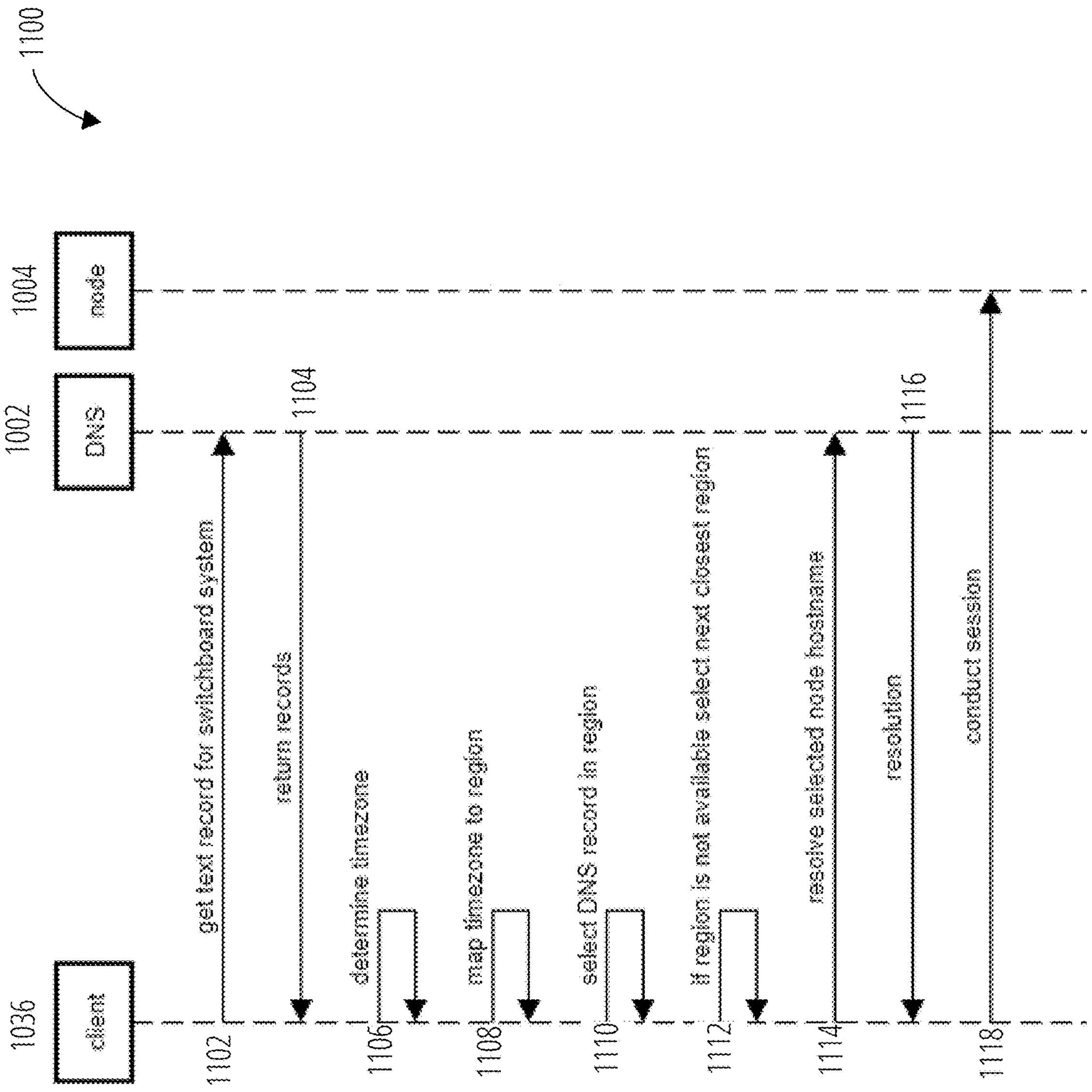
FIG. 11 illustrates a sequence flow in accordance with one embodiment.

In some embodiments, the nodes 1004 may operate in a cloud-based computing environment, e.g., a collection of hardware, software, and networking components that enable the delivery of cloud computing services. The switchboard nodes 1004 and the computing services are delivered over the Internet and can be accessed from anywhere in the world with an Internet connection. In embodiments, client 1036 may access a switchboard node 1004 through Domain Name System 1002 or Domain Name System (DNS). The DNS 1002 is a hierarchical and distributed naming system for computers, services, and other resources connected to the Internet or other networks. It associates various information with domain names assigned to each registered participant. In one example, the DNS 1002 may translate a name known to software executing on a client 1036 to route data to one or more of switchboard node 1004 of the switchboard system. In embodiments, the DNS 1002 may generate a number, such as an Internet Protocol (IP) address, an address record (A-record), or another Hostname (C-name record). FIG. 11 illustrates one example sequence 1100 for a client to identify and resolve an identifier for one of the nodes 1004 of the switchboard system. At a high level, the Domain Name System 1002 translates known domain names to numerical Internet Protocol (IP) addresses needed for locating and identifying computer services and devices with the underlying network protocols. Clients use the global DNS system to select the best node to use, as discussed in sequence 1100.

In embodiments, a client 1036 communicates with the switchboard system to perform one or more of the partner services 1032, such as conducting a transaction with a merchant, validating the customer (e.g., validating the customer account associated with the contactless card 102 so that the communication described herein can proceed), or other tap-to functions. Once client 1036 identifies a switchboard node 1004 and resolves an address to communicate with switchboard node 1004, client 1036 may send one or more messages to switchboard node 1004 to authenticate and perform the operation. The switchboard node 1004 includes an authentication 1010 function that is configured to authenticate the client 1036. In embodiments, the client 1036 sends a message or authorization request to the switchboard node 1004 with the following header set:

X-Sb-Api-Key: <CLIENT API KEY>

X-Sb-Dvc-Fngrprnt: Device-specific device fingerprint

The CLIENT API KEY may have the following example structure: 65535-GReyx5BuEAaE72bWbFZJfHRL8Dbt1Uum, where table 1 describes the value, name, and meaning:

TABLE 1

| Value | Name | Meaning |
|---|---|---|
| 65535 | Client ID | Individual identifier of client |
| GReyx5BuEAaE72bWbFZJfHRL8Dbt1Uum | Client Key | Randomly assigned key |

The switchboard node 1004 may authorize or authenticate the client 1036 or user, and the switchboard node 1004 may utilize the additional components, such as the session and session and node generator 1006 and message router 1008, to perform the operations. Note the validation system 1024 never interact with the merchant system 1022, nor vice versa. The nodes 1004 brokers all communication.

In embodiments, the switchboard system 1000 may utilize a hyperledger fabric 1020 to manage to synchronize the shared operation data 1012 and member management across the network. The hyperledger fabric 1020 is distributed ledger framework having a permissioned network model that only authorized participants can join the network and access the data that is stored on a ledger.

In embodiments, the hyperledger fabric 1020 may be generated by creating one or more sets of peers, an ordering service, and a channel. Once the network is created, system 1000 deploys chaincode to the network, or node 1004 is permitted to access the fabric. The chaincode is the code that runs on the blockchain and executes the network control 1026 and operation data 1012 logic code. Once the chaincode is deployed, each of the switchboard nodes 1004 is configured to invoke transactions on the blockchain to add data to the blockchain, e.g., the operational data. A switchboard node 1004 or another device can query the ledger to retrieve data. The ledger is a distributed database that stores all the data added to the blockchain.

All nodes 1004 keep an independently verifiable log of their actions that can be transmitted to a centralized aggregator to build a picture of overall network usage. System 1000 can manage network operation data and management at a central level and have a centralized view of network use, aggregated and abstracted to the appropriate level.

Once the node 1004 verifies the encrypted data and therefore the user account associated with the contactless card 102, a message is sent to the communication server 108 or another computing device associated with the communication server 108 indicating that the user account is verified based on the authentication code from encrypted data. The communication server 108 is not illustrated in FIG. 10, but the merchant system 1022 can be replaced by the communication server 108. The communication server 108 can be a server for a call center system, and upon informing the communication server 108 that the user account is verified, the communication generated by the client device 104 can be permitted to proceed. In such an embodiment, the communication server 108 can be sent a message that the user account is permitted to make the communication, and then the communication server 108 can send a message to the client device 104 instructing the client device 104 to proceed with generating the communication, or to proceed to another step in the communication. For example, the communication can be paused by the communication server 108 until the communication server 108 receives the message that the user account is validated, at which pint, the communication server 108 can allow the generated communication to proceed.

FIG. 11 illustrates an example sequence 1100 for a client to utilize DNS to resolve and communicate with one or more nodes of a switchboard system. The illustrated sequence 1100 includes a client 1036, a DNS 1002, and a switchboard node 1004. At 1102, the sequence 1100 includes the client 1036 sending a request to a default DNS server for a text record switchboard. {domain}.{tld}. The text record may be preconfigured in a client app and/or client SDK. At 1104, the DNS 1002 returns one or more records. A DNS record structure may include the following:

Root Record:
  Name: switchboard.{domain}.{tld}
  Type: TXT
  Resolution:
    {nodename_1}.{operator_a}.{region_i}.switchboard.{domain}.{tld},
    {nodename_2}.{operator_a}.{region_i}.switchboard.{domain}.{tld},
    {nodename_1}.{operator_b}.{region_ii}.switchboard.{domain}.{tld},
    {nodename_2}.{operator_b}.{region_ii].switchboard.{domain}.{tld},
    * etc.
  Used For determining where there are active nodes
Node Record:
  Name: {nodename}.{operator}.{region}.switchboard.{domain}.{tld}
  Type: A/AAAA or CNAME
  Resolution: Actual node hostname or IP
  Used For: communicating with a node 1004

In embodiments, the client 1036 may determine the current timezone at 1106. For example, the client app or SDK may utilize a get current timezone function, such as in JavaScript: Intl.DateTimeFormat( ).resolvedOptions( ).timeZone). Embodiments are not limited in this manner, and the app or SDK may determine the timezone via another/different function call. At 1108, the client 1036 is configured to map the timezone to a region or short-version identifier of the region. One example includes America/New_York→na-e. The region may be based on DNS names, for example. Table 2 illustrates a few examples of timezone mappings to regions:

TABLE 2

| Timezone | Region | Short Version |
|---|---|---|
| America/New_York | North America/East | na-e |
| America/Buenos_Aires | South America | sa |
| US/Pacific | North America/West | na-w |
| Europe/Paris | Europe | eu |

Embodiments are not limited to these examples, and other timezone-to-region mappings may be utilized. Further and in embodiments, Regions can also be represented as a bidirectional graph structure with the edges representing geographic neighbors. For example, na-e↔na-w and sa↔na-w and sa↔na-e. This representation is useful for node selection.

At 1110, the client may identify or select a DNS record option returned at 1104 that is in the region. If there are multiple matches, the client may select one at random. If there's no node available in a region, the client may determine and use a data graph of neighboring regions to select a node in the closest region where a node is available at 1112. For example, sa has no node but is connected to na-e where there is a node and so na-e is selected. In some embodiments, At 1114, the client may resolve a selected node's hostname. In embodiments, the client 1036 may automatically resolve the hostname using the client's HTTP request default resolver. At 1116, the Domain Name System 1002 may return a result. And at 1118, the client 1036 may communicate with a switchboard node 1004 and begin the process to interact with the switchboard.

Figure 12A:
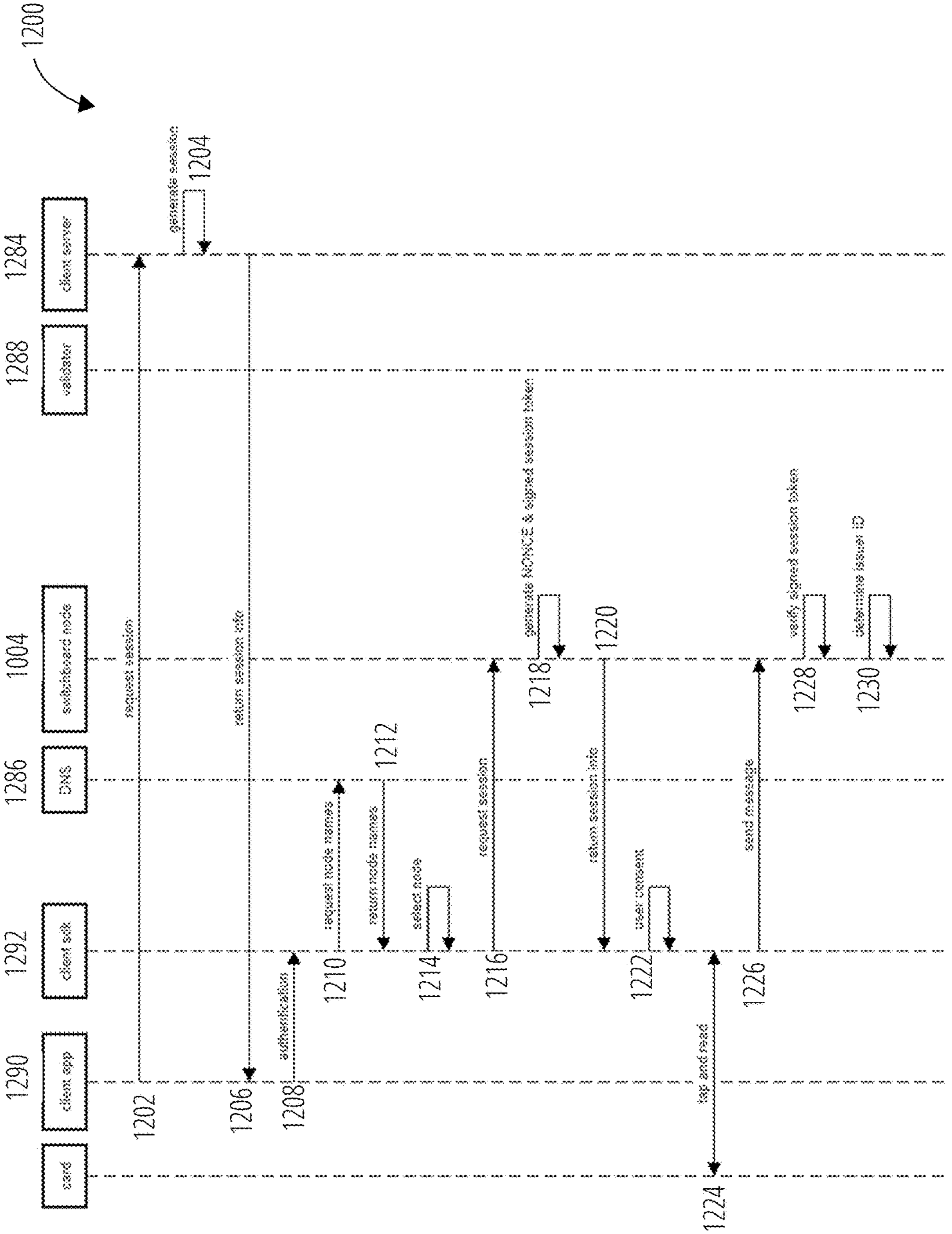
FIG. 12A illustrates a flow diagram detailing an aspect of the subject matter in accordance with one embodiment.
Figure 12B:
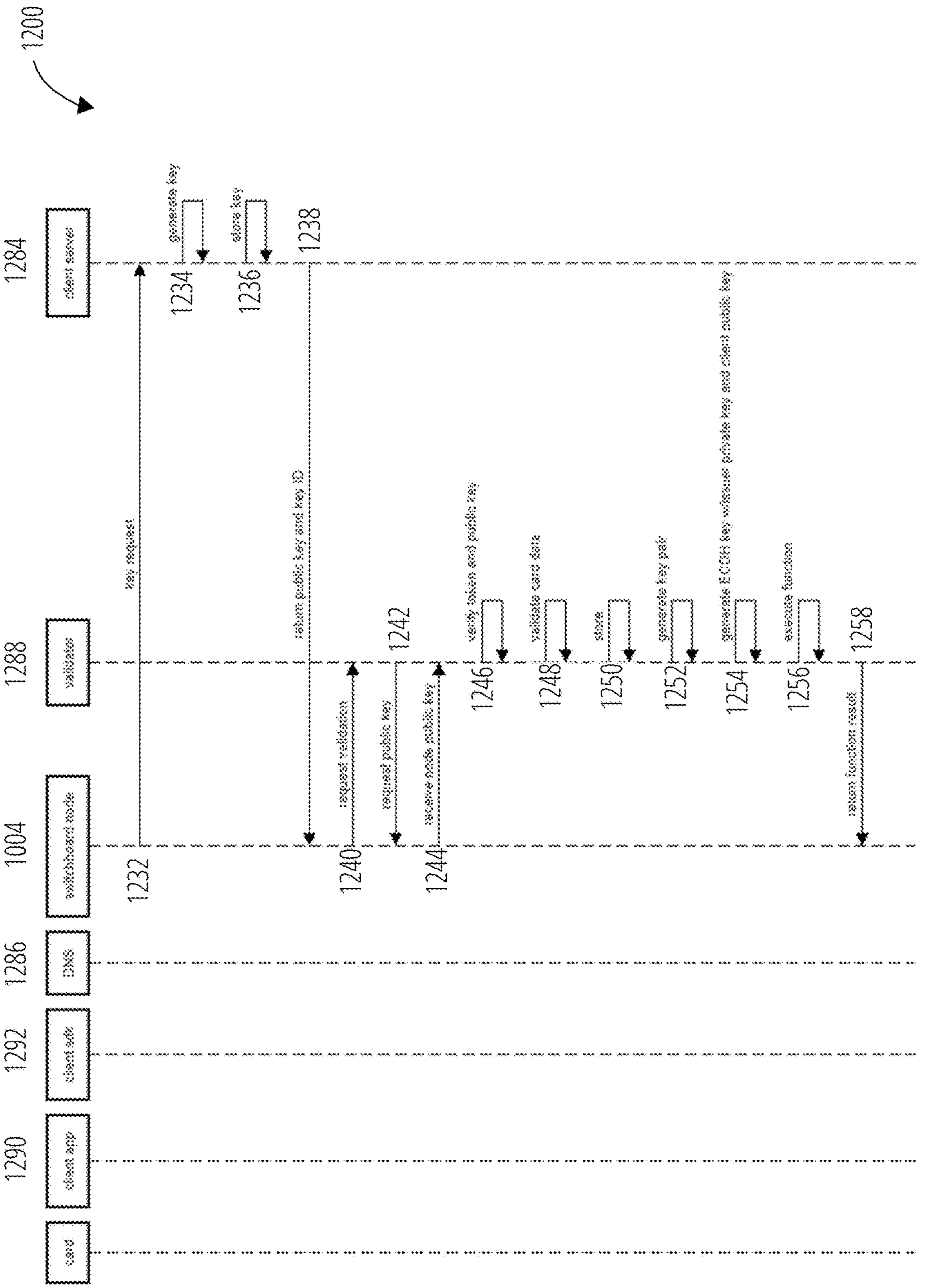
FIG. 12B illustrates a flow diagram detailing an aspect of the subject matter in accordance with one embodiment.
Figure 12C:
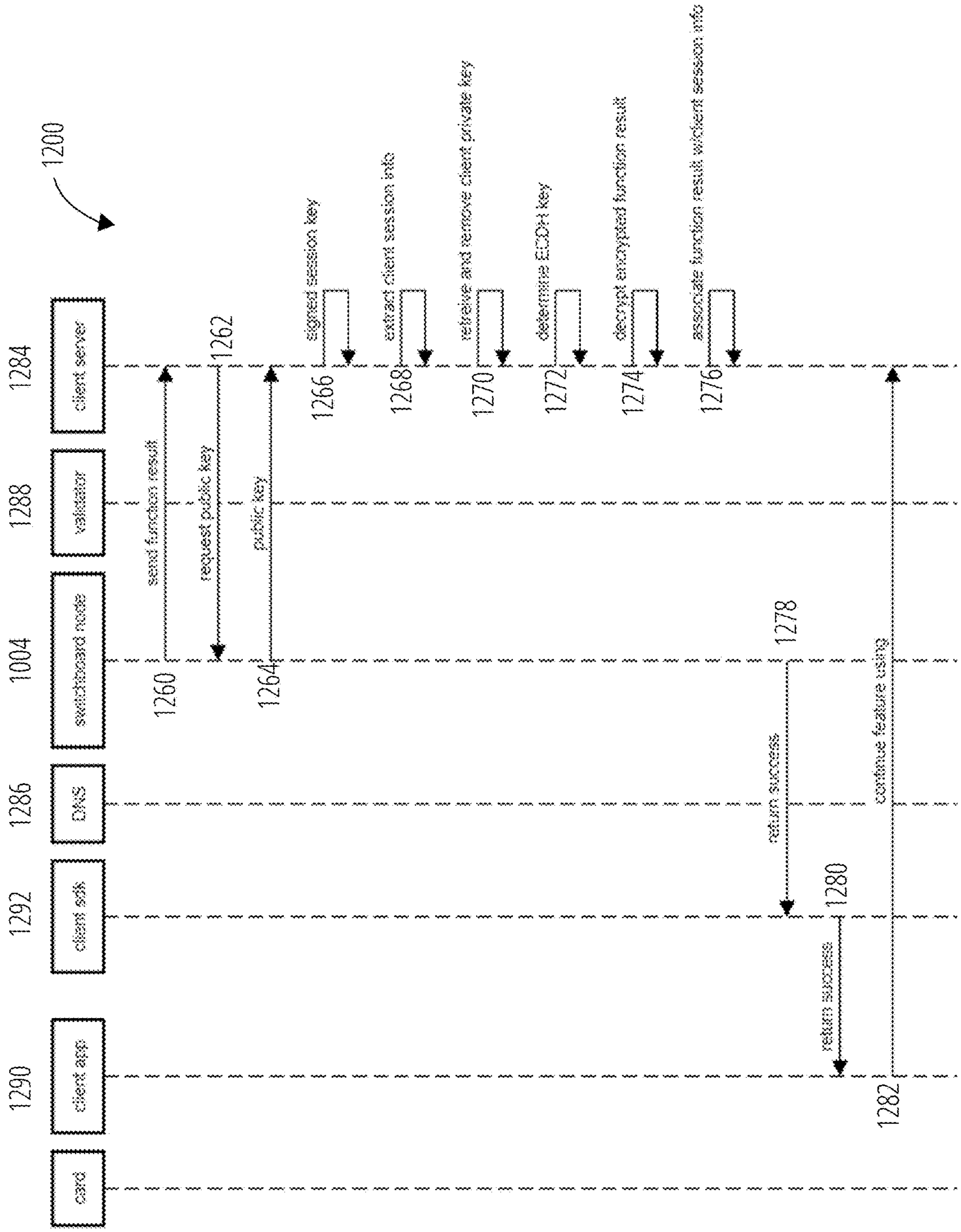
FIG. 12C illustrates a flow diagram detailing an aspect of the subject matter in accordance with one embodiment.

FIG. 12A-FIG. 12C illustrate an example sequence 1200 to perform operations between a contactless card and services provided by a card issuer and/or merchant. The illustrated sequence 1200 includes actions and communications performed by a contactless card 102, a client 1036 including a client app 1290 and a client SDK 1292, a DNS 1286, a switchboard system including one or more nodes 1004, a partner services 1032 including a merchant and/or validator 1288, and control services 1034 including a client server 1284 or system. In embodiments, the client app 1290 may be any application configured to execute on a client 1036, such as a banking app, a merchant app, a social media app, a travel app, a gaming app, a productivity app, an entertainment app, and so forth. In embodiments, the client app 1290 includes a web browser to provide websites and pages. The client app 1290 may include and/or utilize the client SDK 1292, which may be a set of instructions that enable the client app 1290 to communicate with other components of the switchboard system.

FIG. 12A illustrates that, in embodiments, at 1202 the client 1036 including the client app may send a request and establish a session with a client server 1284 such that a result may be associated with the correct client device or user. The request establishes a relationship between the client device and client server, which may be an issuer server. At 1204, the client server 1284 generates a session and CLIENT SESSION INFORMATION. At 1206, the client server 1284 returns the session information, e.g., the CLIENT SESSION INFORMATION. In embodiments, the CLIENT SESSION INFORMATION may be the Client implementation-specific user session identification information.

At 1208, the client 1036 may initiate a contactless card authentication process with the client 1036. For example, the client 1036 may call a function and/or pass information to the client 1036 to initiate authentication via a contactless card. At 1210-1214, the client 1036 may utilize DNS to identify a node and establish communication with the node. Specifically, at 1210, the client 1036 including the client SDK 1292 may send a request for switchboard hostnames, and at 1212 the the DNS 1286 may return information including one or more hostnames. At 1214, the client 1036 may determine a switchboard node to communicate. FIG. 11 illustrates an example of a more detailed sequence of the process to establish communication with a switchboard node.

At 1216, the client 1036 may send a request for a session to the switchboard system 1000. In embodiments, the request for a session may be for a function request in the format <FUNCTION REQUEST>. In embodiments, the FUNCTION REQUEST may be the data/function that the client would like to request once a contactless card has been validated. The function could be for any service discussed herein, e.g., authenticate the user, perform a transaction, request autofill data, etc. At 1218, switchboard system 1000 may generate a nonce and a signed session token. The signed session token may be a JSON Web Token (JWT). When generating the JWT, the following elements should be set:

iss: The unique ID of the current node, nonce: An 8 hex character, randomly generated nonce, exp: The expiration timestamp (+5 minutes), client_id: The requesting client's Client ID, sub: The requesting client's Device Fingerprint, sid: Arbitrary session info sent from the client, scope: The function being requested to be performed.

The nonce may be unique, random bytes generated to ensure the unrepeatability of a message with a contactless card. The nonce is critical to the security and operation of the switchboard system 1000. The nonce validity is tracked by tying it to a session which can be validated by any member of the platform. As mentioned, sessions are JSON Web Tokens signed using a node-specific private key issued by the network. These JWTs are verifiable by a system with the corresponding public key, which they can also verify by confirming it was issued by us or an approved delegate. The signed session token is a JWT-generated token to establish the validity and expiration of the nonce and to associate the contactless card tap to the current client session. For example, the signed session token includes <NONCE>, <CLIENT SESSION INFO>, and <FUNCTION REQUEST> signed with <NODE PRIVATE KEY>, where the NODE PRIVATE KEY is the switchboard system 1000 private key. The switchboard system 1000 may include a NODE PUBLIC/PRIVATE KEY, which is a keypair used to sign and validate JWTs.

At 1220, the switchboard system 1000 may return session information to the client 1036. The session information may include the signed session token (<SIGNED SESSION TOKEN>), the NONCE <NONCE>, the function terms of service <FUNCTION TOS>, and the terms of service version <TOS VERSION>. The FUNCTION TOS may be the terms of service that the user must consent to in order to allow the client to execute the requested function, and the TOS VERSION may be the version of the terms of service. At 1222, the client SDK 1292 may determine and/or receive user consent to the terms of service. In one example, the client SDK 1292 captures and records the user consent to <FUNCTION TOS> on <CONSENT DATE> with <TOS VERSION>. The CONSENT DATE may be the timestamp for the user's consent to the TOS.

At 1224, the client 1036 exchanges one or more messages with a contactless card. In one example, the exchange may be based on the contactless card being tapped to a client device. In embodiments, the client SDK 1292 may provide data (e.g., the encrypted data described hereinabove) to the contactless card 102 to use during the session to perform the function. The data may be provided to the contactless card 102 in an NDEF message. In one example, the data is written to the card in NDEF format using a binary update command. The data may include a NONCE to provide a level of security that the message received from the card is part of the same session. Additionally, the data may include additional information, such as one or more control bits to control the format generated by the contactless card. Table 3 below illustrates an example of an NDEF message format.

TABLE 3

| Byte | Data Item | Value |
|---|---|---|
| 00 | NDEF Message Tag | D1 (only record) |
| 01 | Length of Record Type | 01 |
| 02 | Length of Record | 33 |
| 03 | text record type | 54 |
| 04 | Length of Language | 02 |
| 05-06 | Language | 65 6E ("en") |
| 07 . . . 0E | NONCE | 8 bytes of ASCII HEX encoded 4 bytes binary data |
| 0F . . . 12 | Session Indicators | 4 bytes of ASCII HEX encoded 2 bytes binary data |
| 13 . . . 16 | Control Indicators | 4 bytes of ASCII HEX encoded 2 bytes binary data |
| 17 . . . 26 | Update Date creation Time | 16 bytes of ASCII HEX encoded 8 bytes binary data - represents 64 bit unix timestamp |
| 27 . . . 36 | Update MAC | MAC to protect control indicators - 16 bytes of ASCII HEX encoded 8 bytes binary data |

The updated MAC may be calculated to protect the control indicators in embodiments. Specifically, the MAC M is determined by calculating a MAC over the 10 bytes of the update data U with the Update MAC Card Key (MCK), as described in FIG. 13.

At 1224, the contactless card may generate and provide a message to the client's device including the client SDK 1292. The data in the message may be utilized by the system discussed herein to perform the function requested. One example of the message is illustrated and described in FIG. 13, message 1300.

At 1226, the client including the client SDK 1292 may send a message and information to the switchboard system 1000. The message may be the message received from the contactless card 102, e.g., message 1300. In addition, the client SDK 1292 may send the consent date, the TOS version, and the signed session token to the switchboard system 1000. The switchboard system 1000 may utilize the information to ensure the session is valid. At 1228, the switchboard system 1000 verifies the signed session token is valid, e.g., is the previously provided signed session token and includes the nonce previously generated and is in the message.

In some embodiments, the switchboard system 1000 is configured to determine which issuer system or client-server it should route the message to for processing. At 1230, the switchboard system 1000 may determine the issuer ID by extracting it from the message received from the contactless card 102 via the client SDK 1292. As mentioned, the issuer ID identifies the issuer of the contactless card 102.

As illustrated in FIG. 12B, in some embodiments, the switchboard system 1000 is configured to generate and communicate secure communications with the issuer system, e.g., the client server 1284 and the validator 1288. At 1232, the switchboard system 1000 sends a request for a key to the client server 1284. The key may be utilized to perform secure communications. In one example, the key request may be an elliptical curve Diffie-Hellman (ECDH) key request. Embodiments are not limited in this manner. Alternative key protocols may be utilized, e.g., Supersingular isogeny Diffie-Hellman key exchange (SIDH or SIKE), a private/public key pairing (RSA), etc.

At 1234, the client server 1284 generates a portion of the key. In some instances, the client server 1284 may generate half of the ECDH key for encryption/decryption of PII. Specifically, the client server 1284 may generate <CLIENT EC PUBLIC KEY> and <CLIENT EC PRIVATE KEY> using Elliptic Curve P256. The CLIENT EC PUBLIC KEY AND CLIENT EC PRIVATE KEY is the first half of the ECDH key negotiation.

At 1236, the client server 1284 stores the generated portion of the key in storage. Specifically, the client server 1284 may store <CLIENT EC PUBLIC KEY> and <CLIENT EC PRIVATE KEY> with <KEY ID>, where the KEY ID is used by the Client Server to cache its short-lived EC public/private key for later ECDH key completion, e.g., to identify the ECDH key portions to generate the whole ECDH key. In one example, the key may be stored in a secure memory location and may be used to when PII is received for the session.

In embodiments, the client server 1284 may return the public key portion to the switchboard system 1000 with the KEY ID at 1238. The switchboard system 1000 may store the public key portion with the KEY ID for later use, e.g., generation of the ECDH key. At 1240, the switchboard system 1000 may request a validation to be performed by the validator 1288. In one example, the switchboard system 1000 may send a request validation as Request validation <MESSAGE>, <SIGNED SESSION TOKEN>, <CLIENT EC PUBLIC KEY>, <CONSENT DATE>, and the <TOS VERSION>. The validator 1288 may make an out-of-band request back to the switchboard system 1000 for the public key to verify the session at 1242. At 1244, the switchboard system 1000 may provide the node's public key, i.e., <NODE PUBLIC KEY>. Further at 1246, the validator 1288 may utilize the node's public key to verify the secure session token.

In embodiments, the validator 1288 may validate the message at 1248. In embodiments, the validator 1288 may perform a number of validations including ensuring the nonce in the message is correct along with additional information, such as the card's unique identifier (pUID), and the counter value (pATC).

At 1250, the validator 1288 may store information associated with the session. For example, validator 1288 may store the <CONSENT DATE> with the <TOS VERSION> and the <PUID>. The validator 1288 may also generate another portion of the key, e.g., the ECDH key. For example, the validator 1288 may Generate <ISSUER EC PUBLIC KEY> and <ISSUER EC PRIVATE KEY> using Elliptic Curve P256. The ISSUER EC PUBLIC KEY and ISSUER EC PRIVATE KEY may be the second half of the ECDH key negotiation.

At 1254, the validator 1288 may generate the complete ECDH key. For example, the validator 1288 generates the <ECDH KEY> from <ISSUER EC PRIVATE KEY> and <CLIENT EC PUBLIC KEY>. The ECDH KEY is the final key generated using ECDH key negotiation.

The validator 1288 may utilize the ECDH KEY to encrypt data for the function. For example, if the validator 1288 validates the message in some instances, the validator 1288 may execute a function request to create a function result and encrypt the result with the ECDH KEY at 456. For example, the validator 1288 may Execute <FUNCTION REQUEST> to create <FUNCTION RESULT> and encrypt it with the <ECDH KEY>. The function result may be any result based on the requested function, e.g., verification of the card.

At 1258, the validator 1288 may return the function result to the switchboard system 108. In some instances, the function result is returned encrypted. For example, the validator 1288 may return the <ENCRYPTED FUNCTION RESULT> and the <ISSUER EC PUBLIC KEY>.

As illustrated in FIG. 12C, in embodiments, the switchboard system 1000 sends the function result to the client server 1284 to process the result. In one example, the switchboard system 1000 may send the <ENCRYPTED FUNCTION RESULT>, <KEY ID>, <ISSUER EC PUBLIC KEY>, and <SIGNED SESSION TOKEN>. At 1262 and 1264, the client server 1284 may make a request for and receive the public key from the switchboard system 1000. In some instances, the exchange may be performed via out-of-band communication channels. The public key for the node may be <NODE PUBLIC KEY>. The public key may be used to verify the sender of the function result, etc. At 1266, the client server 1284 may verify the signed session key with the node's public key <NODE PUBLIC KEY> to verify the sender of the information. At 1268, the client server 1284 may extract client information from the signed session token. For example, the client server 1284 may Extract <CLIENT SESSION INFO> from <SIGNED SESSION TOKEN>, i.e., extracting the client implementation-specific user session identification information.

Further, at 1270, the client server 1284 may retrieve the client's private key with the KEY ID. Specifically, the client server 1284 may get and remove the <CLIENT PRIVATE KEY> from cache using the <KEY ID>. At 1272, the client server 1284 may generate or compute the ECDH key. For example, the client server 1284 may compute the <ECDH KEY> with the <CLIENT PRIVATE KEY>+<ISSUER EC PUBLIC KEY>. The client server 1284 may decrypt the function result with the computed key at 1274. Specifically, the client server 1284 may decrypt the <ENCRYPTED FUNCTION RESULT> with the <ECDH KEY> to determine the <FUNCTION RESULT>. At 1276, the client server 1284 associates the function result with the session.

In embodiments, the switchboard system 108 may return whether the function result was successfully completed or not at 1278 to the client SDK 1292. Further at 1280, the client SDK 1292 may notify the client app 1290 of the result. At 1282, the client app 1290 may utilize the feature. For example, the 1282 may communicate with the client server 1284 to continue the feature using the <CLIENT SESSION INFO> to fetch the redacted <FUNCTION RESULT>.

FIG. 13 illustrates an example of a message 1300 that may be communicated by a contactless card to perform the functions described herein, such as, for example, validating the user account associated with the contactless card 102 so that the communication from the client device 104 to the communication server 108 can proceed. One or more of the fields in message 1300 may also be utilized to route the message 1300 through the switchboard system 1000 and perform authentication/validation techniques. Further, although not included in FIG. 13, the message 1300 may also include a URI to be sent to the client device 104, or the message 1300 can be incorporated into a URI to be sent to the client device 104.

In embodiments, the message 1300 includes an applet version 1302 field, an issuer discretionary indicator 1304 field, an Issuer Identifier 1306 field, a pKey ID 1308 field, a pUID 1310 field, a pATC 1312 field, a nonce 1314 field, and an encrypted cryptogram 1316.

In embodiments, the fields may be in plain text or encrypted. For example, the applet version 1302 field may include an applet version in plain text. The applet version indicates which applet version is installed on a contactless card and may be used by the other systems to determine how to process the message 1300 when communicated. For example, different Applet versions require different validation logic, e.g., an older message may be routed through the issuer system to perform various operations for validation, while a newer message may be routed through the switchboard system to perform the various operations, including validation.

In embodiments, the message 1300 includes an issuer discretionary indicator 1304 field that may include issuer data and set at the time of personalization. In addition, the message 1300 includes an Issuer Identifier 1306 field that may include a unique ID assigned to the entity issuing the card, e.g., the issuer. For example, when joining the system, each issuer may be assigned a unique identifier during an onboarding operation. The issuer ID can be used by the switchboard system 1000 to route a message and its contents to the appropriate services that are associated with that particular issuer.

In embodiments, the message 1300 includes a pKey ID 1308 field. In some instances, the pKey ID 1308 field may include data that identifies a set of master keys for a card issuer. The issuer's set of master keys may utilize each card's set of derived master keys or unique derived keys (UDK). Further, each card's own set of master keys (UDKs) may be generated during the personalization of the card. The card's UDKs may be utilized to generate session keys that are used to generate the application cryptogram. The session keys generated by a card may be regenerated by a system, e.g., the validator system, utilizing pKeyID to identify the issuer's master keys to regenerate session keys by the system to perform a validation.

In embodiments, each contactless card 102 is given a unique 16-decimal digit identity (pUID) at the time of personalization. Derivation of the card applet's unique keys using the pUID is performed off-card. The resultant Application Keys are injected during the personalization of the card. In embodiments, a card's Application Keys are the same as the card's derived master keys or UDKs. The process for deriving the Application Keys (UDKs) is described in FIG. 9.

The message 1300 may include a pUID 1310 field, including a card unique identifier assigned to the contactless card at personalization time. The pUID 1310 field data may be a combination of alphanumeric characters used to identify each card and associated with a user uniquely.

In embodiments, the message 1300 includes a pATC 1312 field configured to hold a counter value. The counter value keeps a count of reads (taps) made on the contactless card in a hexadecimal format in one example. Further, a counter value may be used to generate session keys to encrypt at least a portion of a message.

In embodiments, each time a message 1300 is created, a new session key is derived and utilized to generate one or more portions of the message 1300. Specifically, a session key is used to calculate the cryptographic MAC (Application Cryptogram). The card's applet supports a session key derivation option to generate a unique cryptogram session key ASK, and a unique encipherment session key (DESK).

In embodiments, a portion of the data provided in message 1300 is static and set on the card during the personalization of the card and other data is dynamic and may be generated by the card during an operation, e.g., when a read operation is being performed. Note that in some instances, the static information may be updateable, but may require the customer and card to go through a secure update process, which may be controlled by the issuer.

In embodiments, the contactless card 102 may communicate a message between a device, such as a mobile device, during a read operation. For example, in response to the contactless card 102 being tapped onto a surface of the device, e.g., brought within wireless communication range, a read operation may be performed on the contactless card 102, and the contactless card 102 may generate and provide the message to the device. For example, once within range, the contactless card 102 and the device may perform one or more exchanges for the contactless card 102 to send the message to the device.

The wireless communication may be in accordance with a wireless protocol, such as near-field communication (NFC), Bluetooth, WiFi, and the like. In some instances, a message may be communicated between a contactless card 102 and a device via wired means, e.g., via the contact pad, and in accordance with the EMV protocol.

As discussed above, the contactless card 102 may be deployed with a unique card key, e.g., the UDK, that is generated from an issuer's master key and is used to generate session keys. The following discusses the generation of the UDK and the session keys (ASK) and (DESK). Further, the contactless card may generate encrypted data or a cryptogram comprising data as discussed herein with the generated keys. The encrypted data may be encrypted with session keys that are changed each time data is encrypted. In one embodiment, the session keys are generated from card master keys or unique diversified keys that are stored on the contactless card. The unique diversified keys may be generated from the issuer's master keys. For example, in some instances, operations to generate the unique diversified keys may be performed off the card at personalization time and then stored in the memory of the card. Further, the issuer's master key(s) may be utilized to generate card master keys. The card master keys may also be known as application keys or UDKs. Each contactless card may have one or more UDKs.

In embodiments, each contactless card 102 includes one or more applications, such as an authentication application, that is given a unique 16-digit identity (pUID) at time of personalization. Each contactless card may also receive application keys, which may also be known as unique card keys (UDKs) or card master keys using the pUID. In some instances, these operations are performed off-card, and the resultant keys are injected during personalization. However, in other instances, one or more of the operations may be performed on the card, e.g., at the time of manufacturer, each time an operation is performed with a key, and so forth.

Embodiments include a system configured to generate a number of issuer master key sets and assign each a unique three-byte pKey identifier (pKey ID). As mentioned, systems discussed herein may support many card issuers, and each card issuer may have one or more of its own sets of unique issuer master keys that can be identified with a pKey ID. For each application, such as the authentication application, the system may perform the following operations to generate application keys or UDKs.

In embodiments, the system assigns a pKey ID to a card or pUID, a card application's unique 16-decimal digital identity. The system initiates generating a card's UDK(s). Specifically, the system generates a 16-digit quantity (X) from the 16-digit pUID. In one example, the 16-digit X may be generated by randomly rearranging the 16-digit pUID. In another example, X may be the same as the 16-digit pUID. Embodiments are not limited in this manner, and other techniques may be utilized to generate X from the 16-digit pUID. In embodiments, the 16-digit quantity X may be utilized to generate one or more UDKs.

In instances, the system computes or calculates a first portion (ZL) by encrypting X with an issuer master key. An encryption algorithm, such as DES or DES variant, may be utilized in embodiments. Embodiments are not limited in this manner, and other examples of encryption algorithms include AES and public-key algorithms, such as (RSA).

The system calculates or computes a second portion ZR by XOR'ing X with FFFFFFFFFFFFFFFF and encrypting the result with an issuer master key. Again, an encryption algorithm such as DES, AES, RSA, etc, may be used to encrypt the result of the XOR'ing. The system generates an application key or UDK. Specifically, the system concatenates ZL with ZR to form the application key. Embodiments are not limited to concatenating the two portions (ZL and ZR). They may be combined using other techniques. Additionally, the above-described process can be performed any number of times to generate additional application keys, e.g., by utilizing different master issuer keys. In embodiments, a contactless card stores the generated application key(s) or UDK(s).

In embodiments, the contactless card 102 utilizes the application key(s) or UDK(s) to generate session keys for each encrypted data is generated. The following is one processing flow that may be performed by the contactless to generate a unique cryptogram session key (ASK).

To generate the ASK, the contactless card 102 computes SKL by encrypting [ATC [2]||ATC[3]||'F0'||'00'||[ATC [0]||[ATC [1]||[ATC [2]||[ATC [3]] with an application key. Further, the contactless card computes SKR by encrypting [ATC [2]||ATC [3]||'0F'||'00'||[ATC [0]|| [ATC [1]||[ATC [2]||[ATC [3]] with the application key. Finally, the contactless card concatenates SKL with SKR to form an authentication session key (ASK). In embodiments, the ASK is used to perform operations utilizing the contactless card, such as encrypting the cryptographic MAC.

In embodiments, the contactless card 102 also supports session key derivation to generate a unique encipherment session key DESK. The contactless card computes an SKL by encrypting [ATC [2]||ATC [3]||'F0'||'00'||'00'||'00'||'00'||'00'] with a Data Encryption Key (DEK) or UDK. Further, the contactless card computes SKR by encrypting [ATC [2]||ATC [3]||'0F' ||'00'||'00||'00'||'00'||'00'] with the DEK or UDK. The contactless card concatenates SKL with SKR to form the Data Encipherment Session Key (DESK).

In embodiments, the contactless card 102 generates encrypted data or a cryptogram utilizing the session keys. Specifically, the contactless card generates a cryptogram C by calculating a MAC over the 32-byte transaction data T using the Authentication Session Key (ASK).

The contactless card 102 may process the data to generate the cryptogram. Specifically, the contactless card divides T into four blocks of 8 bytes of data: T=T1||T2||T3||T4. The contactless card computes B=DES(ASKL) [T1], where is the Data Encryption Standard or another symmetric encryption algorithm, ASKL is a portion of the ASK, e.g., the "left"

half of the key. The contactless card computes B=[B XOR T2], and, the contactless card computes B =DES (ASKL) [B], where DES is an encryption algorithm. The contactless card computes B=[B XOR T3], and the contactless card computes B=DES (ASKL) [B]. The contactless card computes B=[B XOR T4], and the contactless card computes B=DES (ASKL) [B]. The contactless card computes $B=DES^{-1}$(ASKR) [B], where $DES^{-1}$ is the reciprocal DES operation, and ASKR is a portion of the ASK, e.g., the right half. The contactless card computes the cryptogram C=DES (ASKL) [B].

In embodiments, a contactless card 102 may also encipher the cryptogram to secure the data further. For example, a contactless card may generate an 8-byte random number [RND] and the card computes E1=DES3(DESK) [RND], where DES3 is a symmetric encryption algorithm such as the Triple Data Encryption Standard. The contactless card then computes B=[E1] XOR [C], where C is the cryptogram generated, as discussed above. The contactless card computes E2=DES3 (DESK) [B], where B is computed above. Further, the contactless card generates the 16-byte enciphered payload E=[E1]||[E2].

In embodiments, a device or the contactless card 102 may decrypt the payload E by determining, receiving, or retrieving the payload E. The device computes a $RND=DES3^{-1}$ (DESK) [E1]. The device determines $B=DES3^{-1}$(DESK) [E2], and the device computes C=[E1] XOR [B].

In embodiments, the contactless card 102 generates or calculates a message authentication code (MAC). In some instances, the MAC may be an updated MAC. In embodiments, the updated MAC is included in data communicated from a contactless card to another device, such as a mobile device, point-of-sale (POS) terminal, or any other type of computer. In one example, the updated MAC may be included in an NDEF message.

In embodiments, the updated MAC may be calculated to protect the control indicators and include an updated date/time. For example, the update MAC M is determined by calculating a MAC over the 10 bytes of the updated data U with the Updated MAC Card Key (MCK) as follows.

Embodiments include determining data to process through a number of calculations and computations. In one example, the data U equals the [Control Indicators (2 bytes)||Update Date Time (8 bytes)||'80'||'00 00 00 00 00']. For the calculations, the data may be divided into two separate portions. Specifically, the data U is broken into two blocks of 8 bytes of data, where $U=U_1||U_2$. Further, operations may be performed on $U_1$ and $U_2$.

Embodiments include applying an algorithm to the first portion ($U_1$) of the data. In one example, a result B may be computed where B=DES (MCKL) [U1], where DES is a Data Encryption Standard algorithm using a first portion (L) of the MAC Card Key (MCKL).

Further, an additional operation may be performed on the result B. Specifically, the result B may be exclusively or'd (XOR) with a second portion of the data ($U_2$).

The updated result B may be further processed. For example, result B may be further processed by applying the DES algorithm using MCKL again to B. The result the inverse DES may process B with a second portion (R) of the MCK (MCKR), and the MAC M may be determined by applying the DES algorithm with the MCKL to result B.

Figure 14:
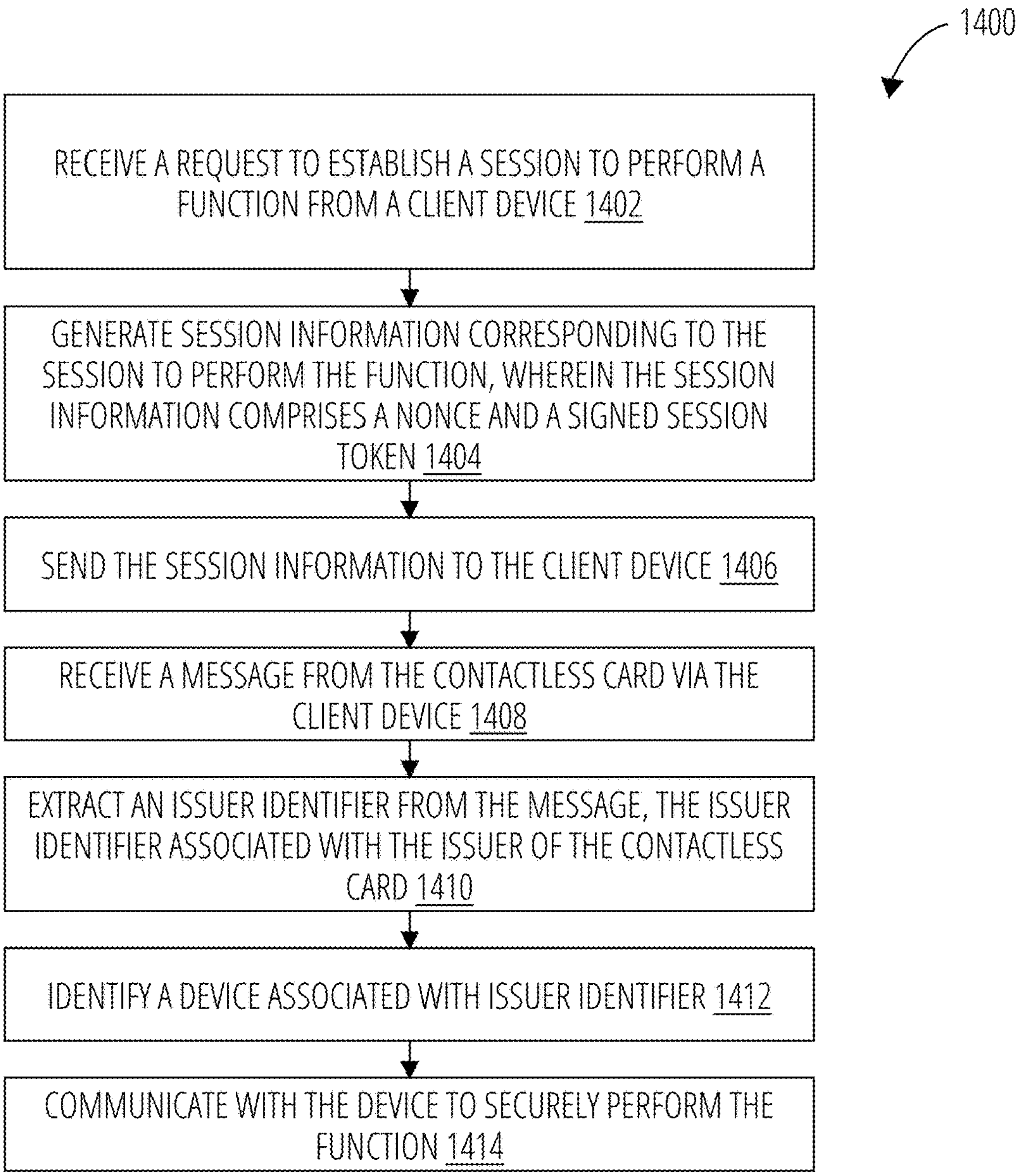
FIG. 14 illustrates an example routine in accordance with one embodiment.

FIG. 14 illustrates an example of routine 1400 in accordance with embodiments discussed herein. In block 1402, the routine 1400 includes receiving, by a node in a system, a request to establish a session to perform a function from a client device, wherein the function is at least partially performed utilizing a contactless card 102. In some instances, the node may be one of a plurality nodes of a switchboard system. The node may be previously selected by the sending device via a DNS operation performed. In embodiments of the present disclosure, the function includes validating that the user account associated with the contactless card 102 is authorized to generate a communication to the communication server 108 and thereby, for example, conduct a call with a call center system to receive customer service or some other service.

In block 1404, the routine 1400 includes generating, by the node, session information corresponding to the session to perform the function, wherein the session information comprises a nonce and a signed session token. The nonce and/or signed session token may be utilized by systems to perform the functions described herein while ensuring the node routing the data is authenticated, the message from the contactless card 102 is authenticated, and to keep track of the session for the function.

In block 1406, routine 1400 includes sending the session information to the client device 104 by the node. The client device 104 may communicate with a contactless card 102 to receive data from the card to authenticate and perform a function. In some instances, the client device 104 may send the nonce from the node to the contactless card 102. The contactless card 102 may utilize the nonce when generating the message to communicate back to the client device 104. Finally, the node, e.g., incorporates it into a cryptographic portion of the message (see, for example, FIG. 13).

In block 1408, routine 1400 includes receiving, by the node, a message from the contactless card 102 via the client device 104. The message may be generated by the contactless card 102. FIG. 13 illustrates one example of a message 1300. In some embodiments, the node verifies the message. For example, the node may verify a nonce in the message and a signed session token.

In block 1410, routine 1400 extracts an issuer identifier from the message by the node, the issuer identifier associated with the issuer of the contactless card. In some instances, the issuer identifier may be in a plaintext format.

In block 1412, routine 1400 identifies, by the node, a device associated with the issuer identifier. For example, the node may perform a lookup to determine a server associated with the issuer identifier and the function to be performed.

In block 1414, routine 1400 communicates, by the node, with the device to securely perform the function.

Figure 15:
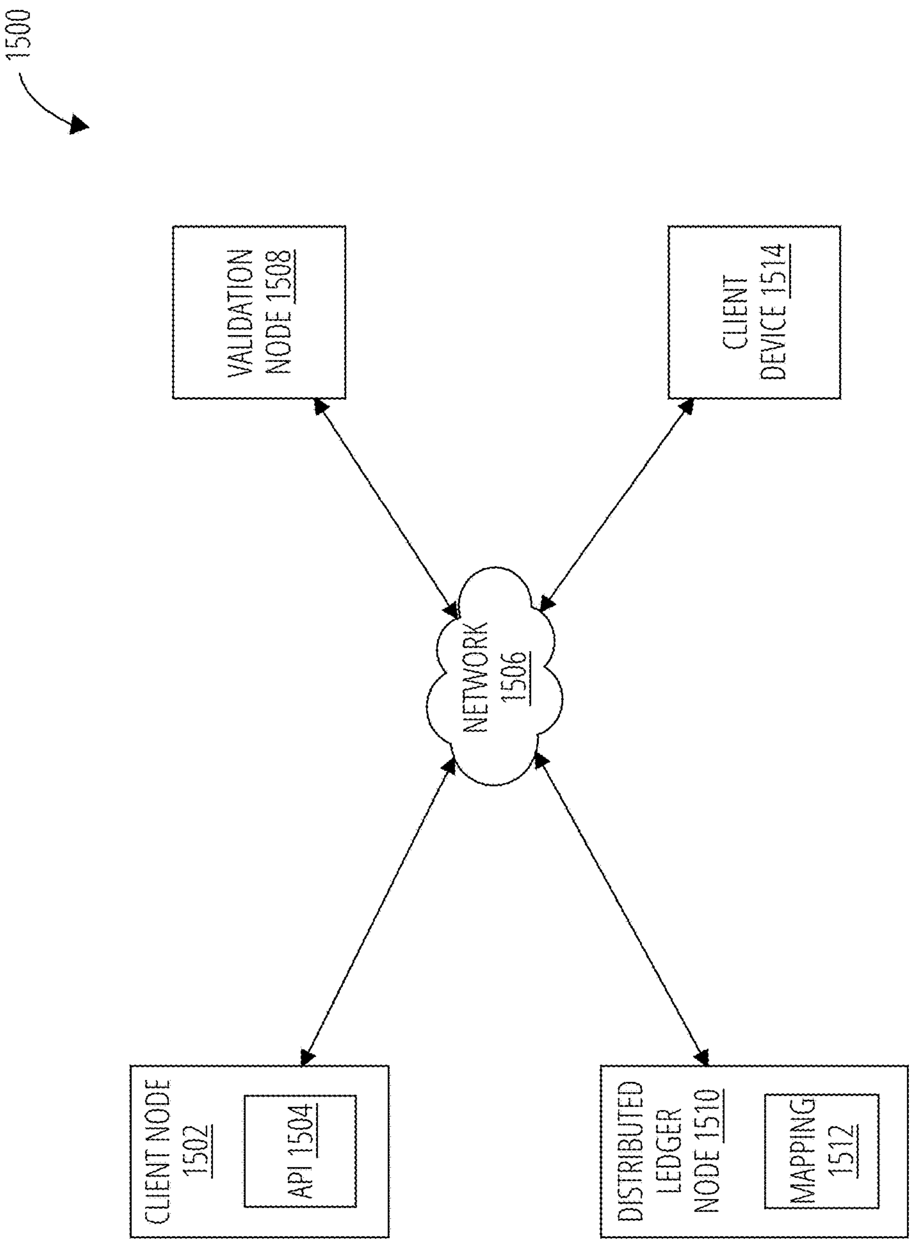
FIG. 15 illustrates a network diagram according to an aspect of the subject matter in accordance with one embodiment.

FIG. 15 illustrates a distributed network authentication system 1500 according to an example embodiment. The distributed network authentication system 1500 can act or operate as the authentication server 110 described herein. As further discussed below, system 1500 can include client node 1502, API 1504, network 1506, distributed ledger node 1510, mapping 1512, and client device 1514. Although FIG. 15 illustrates single instances of the components, system 1500 can include any number of components.

System 1500 can include a client node 1502, which can be a network-enabled computer as described herein. In some examples, client node 1502 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1500.

In some examples, client node 1502 can execute one or more applications, such as software applications, that enable, for example, network communications with one or more components of system 1500, transmit and/or receive data, and perform the functions and processes described herein.

The client node can contain an API 1504. For example, various different APIs can be provided for an application (e.g., executed on a computing device, such as a network-enabled computer) that can interact with a service. For example, an application executed on a device (e.g., a smart phone, smart watch, tablet, laptop, or other device) call interact with a web-based service by calling the API 1504 to interact with the service, such as by performing a remote call to an API for interacting with a web-based service.

API 1504 can be provided in the form of a library that includes specifications for routines, data structures, object classes, and variables. In some cases, such as for representational state transfer (REST) services, an API (e.g., a REST API or RESTful API, or an API that embodies some RESTful practices) is a specification of remote calls exposed to the API consumers (e.g., applications executed on a client computing device can be consumers of a REST API by performing remote calls to the REST API). REST services generally refer to a software architecture for coordinating components, connectors, and/or other elements, within a distributed system (e.g., a distributed hypermedia system).

Client node 1502 can communicate with one or more other components of system 1500 either directly or via network 1506. Network 1506 can comprise one or more of a wireless network, a wired network or any combination of wireless network and wired network, and may be configured to connect the components of system 1500. While FIG. 15 illustrates communication between the components of system 1500 through network 1506, it is understood that any component of system 1500 can communicate directly with another component of system 1500, e.g., without involving network 1506.

System 1500 can include a validation node 1508, which can be a network-enabled computer as described herein. In some examples, validation node 1508 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1500.

In some examples, validation node 1508 can execute one or more applications, such as software applications, that enable, for example, network communications with one or more components of system 1500, transmit and/or receive data, and perform the functions and processes described herein.

In some examples, each validation node can be associated with a routing number, and the routing number identifies the entity controlling the keys for the authentication namespace. The authentication namespace can be related to one or more of a particular entity, a particular set of cards, or a particular set of security keys (e.g., master keys, diversified keys, session keys) associated with an entity, a set of cards, or a type of cards.

System 1500 can include a distributed ledger node 1510, which can be a network-enabled computer as described herein. In some examples, distributed ledger node 1510 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1500.

In some examples, distributed ledger node 1510 can execute one or more applications, such as software applications, that enable, for example, network communications with one or more components of system 1500, transmit and/or receive data, and perform the functions and processes described herein.

Distributed ledger node 1510 can containing a mapping 1512. In some examples, mapping 1512 can be in the form of one or more databases. Exemplary databases can include, without limitation, relational databases, non-relational databases, hierarchical databases, object-oriented databases, network databases, and any combination thereof. The one or more databases can be centralized or distributed. The one or more databases can be hosted internally by any component of system 1500, or the one or more databases can be hosted externally to any component of the system 1500. In some examples, the one or more databases can be contained in the distributed ledger node 1510, and in other examples the one or more databases can be stored outside of distributed edger node 1510 but in data communication with distributed ledger node 1510. The one or more databases can be implemented in a database programming language. Exemplary database programming languages include, without limitation, Structured Query Language (SQL), MySQL, HyperText Markup Language, JavaScript, Hypertext Preprocessor Language, Practical Extraction and Report Language, Extensible Markup Language, and Common Gateway Interface. Queries made to the one or more databases can be implemented in the same database programming language used to implement the one or more databases. For example, if the one or more databases are an SQL database, then queries made to the database can be made in SQL (e.g., SELECT column1, column2 FROM table1, table2 WHERE column2='value';). It is understood that the one or more databases can be implemented in any database programming language and that the programming implementation of the query can be adjusted as necessary for compatibility with the one or more databases and to reflect the particular information to be queried.

In some examples, the one or more databases can be contained within distributed ledger node 1510. In other examples, the one or more databases can be remote from distributed ledger node 1510 but in data communication with distributed ledger node 1510. Data communication between the one or more databases and distributed ledger node 1510 can be a direct data communication or data communication via a network, such as the network 1506.

In some examples, client node 1502 can be in data communication with distributed ledger node 1510. Distributed ledger node 1510 can contain mapping 1512. Mapping 1514 may include, e.g., a mapping between a validation node address and the validation node 1508, a mapping between a routing number and a validation node address, and/or a mapping between a routing number and validation node 1508. In some examples, mapping 1512 can include a digital signature associated with an entity having permission to validate for a routing number. Based on one or more of these associations, client node 1502 can call validation node for validation and/or provide direction to the client device to reach the appropriate validation node. This can be accomplished by calling a validation API associated with validation node 1508.

In some examples, iterations of the mappings described herein, such as mapping 1512, can also include a software or applet version number. The version number can be used to identify a validation node or validation node address or choose between multiple validation addresses for one validation node.

In some examples, client node 1502 and distributed ledger node 1510 can be permissioned (e.g., allowed to join a network) with the aid of a certificate and/or a cryptographic authentication mechanism (e.g., a non-fungible token). The certificate and/or a cryptographic authentication mechanism may be issued by, e.g., a consortium authority or other administrative entity associated with the distributed network. If granted appropriate permissions, distributed ledger node 1510 can update mapping 1512 to reflect a different association between, e.g., a routing number, a validation node address, and a validation node. In some examples, degrees of permissions can be issued. For example, if client node 1502 were to function to route data to validation node 1508 (or other validation nodes), client node 1502 can be given a certain level of permissions. As another example, if distributed ledger node 1510 were to have the capability to update mapping 1512, distributed ledger node 1510 can have a different, higher level of permissions.

System 1500 can include a client device 1514, which can be a network-enabled computer as described herein. In some examples, distributed ledger node 1514 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1500. Client device 1514 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, client device 1514 can be in data communication with another network-enabled computer not shown in FIG. 15, such as a smart card (e.g., a contactless card or a contact-based card).

In some examples, client device 1514 can execute one or more applications, such as software applications, that enable, for example, network communications with one or more components of system 1500, transmit and/or receive data, and perform the functions and processes described herein.

In some examples, upon receipt of an authentication request, client device 1514 can call (e.g., via an API) client node 1502. The call can include a routing number and/or an applet or software version number, and client node 1502 can query distributed ledger node 1510 and mapping 1512. Once the query returns the identification of a validation node (e.g., validation node 1508) and/or a validation node address associated with that routing number and/or applet or software version, client node 1502 can reply to client device 1514. Client device 1514 can then proceed with authentication with the validation node. The authentication can be performed by, e.g., the systems and methods described herein, such as by the generation, encryption, transmission, decryption, and validation of a cryptogram as described herein.

In some examples, client node 1502 can be co-resident with validation node 1508. In these examples, client node 1502 can handle the authentication in a single call from client device 1514. In some examples, this can be acceptable only if it is permissible for the full authentication transmission (e.g., a cryptogram as described herein) to be sent to client nodes that are not involved in authentication.

In some examples, if client node 1502 receives, from client device 1514, a routing number that is not handled by its location, client node 1502 can return a code indicating that this routing number is not handled, along with validation node address for the responsible validation node. Client device 1514 can then send the full authentication transmission to validation node 1508 using the received validation node address.

In some examples, client node 1502 can enter the distributed network with different permissions. For example, client node 1502 can be a read-only router of data. As another example, client node 1502 can have permission to send messages to distributed ledger node 1510 updating one or more routing paths for one or more routing numbers. However, client node 1502 would be prevented from updating one or more routing paths for one or more routing numbers for other entities that control other routing numbers which are not associated with client node 1502 or that did not grant this permission. As another example, distributed ledger node 1510 can contain contracts and/or records that can validate the permission of a specific entity to change a specific routing record based on its digital signature. As another example, the consortium authority or other administrative entity controlling the distributed network can have additional privileges to, without limitation, add new members (e.g., client nodes, distributed ledger nodes, validation nodes, and/or client devices), add new signature credentials, add new keys, add new certifications, and also to revoke any of the foregoing. In some examples, the foregoing permissions can be delegated to client node 1502, distributed ledger node 1510, and/or validation node 1508, if security, legal, and/or financial conditions are met, however, delegation is not required.

In some examples, one or more APIs can facilitate communication between components of system 1500 via network 1506. In other examples, one or more APIs are not required. Rather, the components of system 1500 could be in direct communication and/or dedicated to one or more specified entities, to allow the specified entities to keep data from being transferred to, transferred from, or transferred via, non-specified entities. This may further promote data security and avoid detection of data traffic patterns by non-specified entities.

In some examples, entities could establish a standard for nodes having APIs based on the intended function of those nodes. For example, a first standard could be established for data routing nodes and a second standard could established for nodes performing mapping and/or authentication functions. As another example, a routing API, a mapping API, and a validation API can be established, which can allow for the same device or hardware configuration to perform these functions. However, the use of keys, including secret keys by validation node 1508 for authentication, can require storage of the keys in one or more HSMs, to promote key security and ensure that the keys are never entered into memory.

Figure 16:
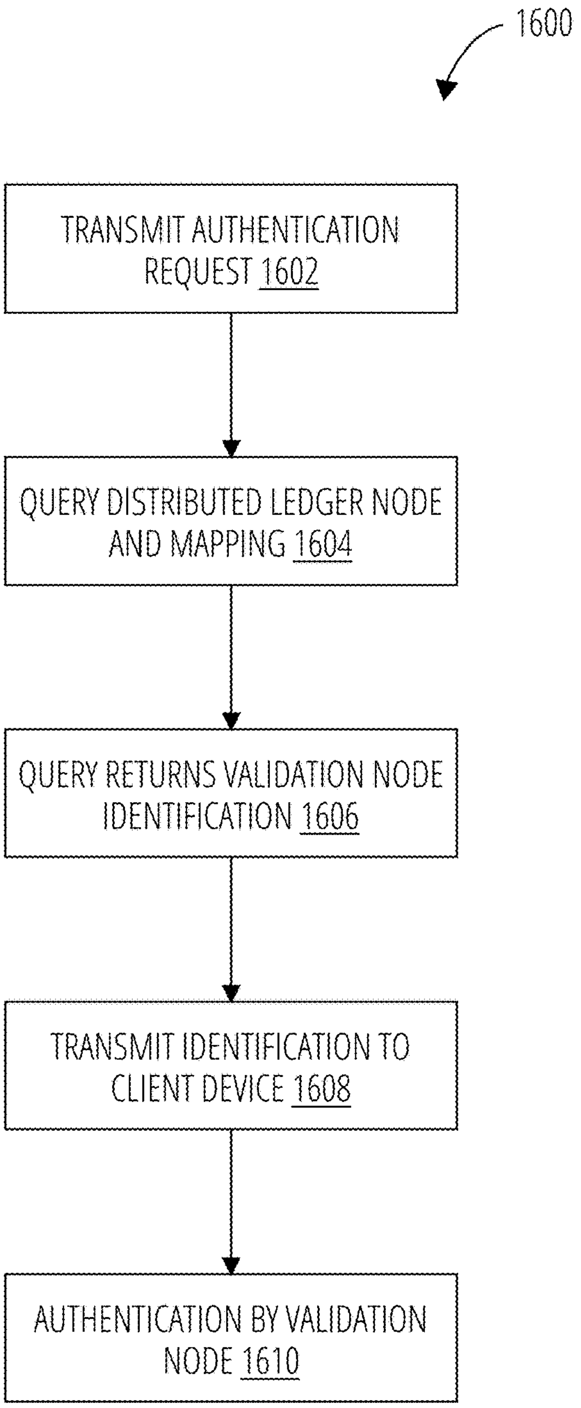
FIG. 16 illustrates a flow chart according to an aspect of the subject matter in accordance with one embodiment.

FIG. 16 illustrates a method 1600 performed by a distributed network authentication system according to an example embodiment. For example, the method can be performed by distributed network authentication system 1500 and or by another distributed network authentication system.

In block 1602, a client device can transmit an authentication request to a client node. The authentication request can include, without limitation, a routing number, a software version number, and/or an applet version number. The request can be made by an API call or other communication between the client device and the client node.

In block 1604, after receiving the authentication request, the client node can transmit a query (e.g., via an API call) to a distributed ledger node. The distributed ledger node contain a mapping, and the distributed ledger node can submit the query to the mapping.

In block 1606, the query can return an identification of a validation node and/or a validation node address, and the distributed ledger node can transmit this identification to the client node.

In block 1608, the client node can transmit the identification to the client device. After receiving the identification, the client device can proceed with authentication with the identified validation node and/or validation node address, in block 1610.

The various elements of the devices as previously described with reference to FIGS. 1-16 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method comprising:

transcoding, by a processor circuit of a contactless card, encrypted data into transcoded data, the encrypted data generated based on one or more cryptographic algorithms and one or more session keys generated from a diversified key stored on the contactless card, wherein transcoding the encrypted data includes:

accessing, by the processor circuit, the encrypted data;

converting the encrypted data into a corresponding numeric data stream; and inserting characters into the corresponding numeric data stream to indicate data separation in the transcoded data; and transmitting, via a communication interface of the contactless card, the transcoded data to a mobile device associated with a user account of the contactless card.

2. The method of claim 1, wherein converting the encrypted data to the corresponding numeric data stream comprises:

using a conversion algorithm that converts a first portion of the encrypted data to a base-ten representation of the first portion; and inserting the base-ten representation of the first portion into a uniform resource identifier (URI) for a communication to be made by the mobile device.

3. The method of claim 2, wherein converting the encrypted data to the corresponding numeric data stream further comprises:

using the conversion algorithm to convert a second portion of the encrypted data to a base-ten representation of the second portion; and inserting the base-ten representation of the second portion into the URI for the communication after the base-ten representation of the first portion.

4. The method of claim 3, further comprising inserting a character between the base-ten representation of the first portion and the base-ten representation of the second portion to indicate separation between the base-ten representation of the first portion and the base-ten representation of the second portion.

5. The method of claim 4, wherein the character is "#" or "*".

6. The method of claim 1, wherein the encrypted data includes one or more portions, each portion of the one or more portions including a hexadecimal value or a base-ten value.

7. The method of claim 6, wherein converting the encrypted data includes converting any of the one or more portions that include a hexadecimal value to a corresponding base-ten value, and leaving unchanged any of the one or more portions that include a base-ten value.

8. An apparatus comprising:

a memory to store instructions;

a communication interface; and a processing circuit to execute the instructions, which, when executed by the processing circuit, cause the apparatus to:

receive, via the communication interface of the apparatus, transcoded data, the transcoded data being transcoded from encrypted data associated with a user account, wherein the transcoded data is included in a uniform resource identifier (URI) for a communication to be initiated by the apparatus; and in response to receiving the transcoded data, automatically initiate the communication based on the transcoded data in the URI, wherein the transcoded data is used as part of a dial entry for the communication.

9. The apparatus of claim 8, wherein the apparatus is to receive the transcoded data from a contactless card in communication with the apparatus via the communication interface.

10. The apparatus of claim 8, wherein at least a first portion and a second portion of the encrypted data are in hexadecimal format.

11. The apparatus of claim 10, wherein the transcoded data comprises a first transcoded portion corresponding to a base-ten representation of the first portion of the encrypted data; and wherein the transcoded data comprises a second transcoded portion corresponding to a base-ten representation of the second portion of the encrypted data.

12. The apparatus of claim 11, wherein the transcoded data includes a character inserted between the first transcoded portion and the second transcoded portion.

13. The apparatus of claim 12, wherein the character is "#" or "*".

14. The apparatus of claim 8, wherein the processing circuit is further to:

send the transcoded data to an interactive voice response (IVR) system for the IVR system to convert the transcoded data back into the encrypted data;

wherein the encrypted data is used to authenticate the apparatus as being associated with the user account.

15. A non-transitory computer-readable storage medium having executable instructions stored thereon, which when executed by a processing circuit of a contactless card cause the contactless card to:

transcode encrypted data into transcoded data, the encrypted data generated based on one or more cryptographic algorithms and one or more session keys generated from a diversified key stored on the contactless card, wherein transcoding the encrypted data includes the processing circuit to:

access the encrypted data;

convert the encrypted data into a corresponding numeric data stream; and insert characters into the corresponding numeric data stream to indicate data separation in the transcoded data; and transmit, via a communication interface of the contactless card, the transcoded data to a mobile device associated with a user account of the contactless card.

16. The non-transitory computer-readable storage medium of claim 15, wherein converting the encrypted data to the corresponding numeric data stream includes the processing circuit to:

use a conversion algorithm that converts a first portion of the encrypted data to a base-ten representation of the first portion; and insert the base-ten representation of the first portion into a uniform resource identifier (URI) for a communication to be made by the mobile device.

17. The non-transitory computer-readable storage medium of claim 16, wherein converting the encrypted data to the corresponding numeric data stream further includes the processing circuit to:

use the conversion algorithm to convert a second portion of the encrypted data to a base-ten representation of the second portion; and insert the base-ten representation of the second portion into the URI for the communication after the base-ten representation of the first portion.

18. The non-transitory computer-readable storage medium of claim 17, further comprising inserting a character between the base-ten representation of the first portion and the base-ten representation of the second portion to indicate separation between the base-ten representation of the first portion and the base-ten representation of the second portion.

19. The non-transitory computer-readable storage medium of claim 18, wherein the character is "#" or "*".

20. The non-transitory computer-readable storage medium of claim 15, wherein the encrypted data includes one or more portions, each portion of the one or more portions including a hexadecimal value or a base-ten value; and wherein converting the encrypted data includes converting any of the one or more portions that include a hexadecimal value to a corresponding base-ten value, and leaving unchanged any of the one or more portions that include a base-ten value.

* * * * *